(12) United States Patent
Sakakibara

(10) Patent No.: US 8,659,917 B2
(45) Date of Patent: Feb. 25, 2014

(54) DIRECT-TYPE CONVERTING APPARATUS AND METHOD FOR CONTROLLING THE SAME

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 546 days.

(21) Appl. No.: 13/001,845

(22) PCT Filed: Jun. 19, 2009

(86) PCT No.: PCT/JP2009/061203
§ 371 (c)(1),
(2), (4) Date: Dec. 29, 2010

(87) PCT Pub. No.: WO2010/001739
PCT Pub. Date: Jan. 7, 2010

(65) Prior Publication Data
US 2011/0122661 A1    May 26, 2011

(30) Foreign Application Priority Data
Jul. 1, 2008    (JP) .................................. 2008-172593

(51) Int. Cl.
*H02M 5/45* (2006.01)
*H02M 7/5387* (2007.01)
(52) U.S. Cl.
USPC .......................................... 363/37; 363/132
(58) Field of Classification Search
USPC ................ 363/34, 37, 71, 125, 127, 131, 132
See application file for complete search history.

(56) References Cited

U.S. PATENT DOCUMENTS

| | | | |
|---|---|---|---|
| 5,367,448 A | * | 11/1994 | Carroll ............................ 363/89 |
| 5,657,217 A | | 8/1997 | Watanabe et al. |
| 7,190,601 B2 | * | 3/2007 | Luukko et al. ................. 363/132 |

(Continued)

FOREIGN PATENT DOCUMENTS

| | | |
|---|---|---|
| CN | 1939766 A | 4/2007 |
| JP | 6-81514 A | 3/1994 |

(Continued)

OTHER PUBLICATIONS

Mazumder, "A Novel Discrete Control Strategy for Independent Stabilization of Parallel Three-Phase Boost Converters by Combining Space-Vector Modulation With Variable-Structure Control", IEEE Transactions on Power Electronics, vol. 18, No. 4, Jul. 2003, pp. 1070-1083.

(Continued)

*Primary Examiner* — Matthew Nguyen
(74) *Attorney, Agent, or Firm* — Birch, Stewart, Kolasch & Birch, LLP.

(57) ABSTRACT

An output voltage of a converter is given to a pair of DC power supply lines. Inverters are connected in parallel with each other between the DC power supply lines. When one inverter is operated based on a first zero vector and the other inverter is operated based on a second zero vector, a commutation is caused in the converter. The first zero vector and the second zero vector are different from each other. For example, all of high-arm side switching elements of the one inverter and low-arm side switching elements of the other inverter are rendered non-conducting, and all of side switching elements of the one inverter and high-arm side switching elements of the other inverter are rendered conducting.

16 Claims, 22 Drawing Sheets

(56) References Cited

U.S. PATENT DOCUMENTS

| | | |
|---|---|---|
| 2007/0069673 A1 | 3/2007 | Oyobe et al. |
| 2009/0175059 A1 | 7/2009 | Sakakibara |
| 2011/0122661 A1 | 5/2011 | Sakakibara |

FOREIGN PATENT DOCUMENTS

| | | |
|---|---|---|
| JP | 9-224393 A | 8/1997 |
| JP | 2003-102131 A | 4/2003 |
| JP | 2005-65356 A | 3/2005 |
| JP | 2007-244114 A | 9/2007 |
| JP | 2007-31589 A | 11/2007 |
| JP | 2007-312590 A | 11/2007 |
| KR | 10-2011-0010812 A | 2/2011 |
| WO | WO 95/24069 A1 | 9/1995 |
| WO | WO 2007/123118 A1 | 11/2007 |

OTHER PUBLICATIONS

Ayano et al., "Reduction Effect of EMI in Parallel Matrix Converter Systems", Journal of IEEJ, vol. 128, No. 3, 2008, pp. 184-192.

Kato et al., "Shoatsukei AC/DC/AC Chokusetsukei Denryoku Henkanki no Hakei Kaizen", National Convention Record I.E.E. Japan, vol. 2007, No. 4, Mar. 15, 2007, pp. 153 to 154.

Ogasawara et al., "Modeling and Analysis of High-Frequency Leakage Currents Caused by Voltage-Source PWM Inverters" Journal of IEEJ, vol. 115, No. 1, 1995, pp. 77 to 83.

\* cited by examiner

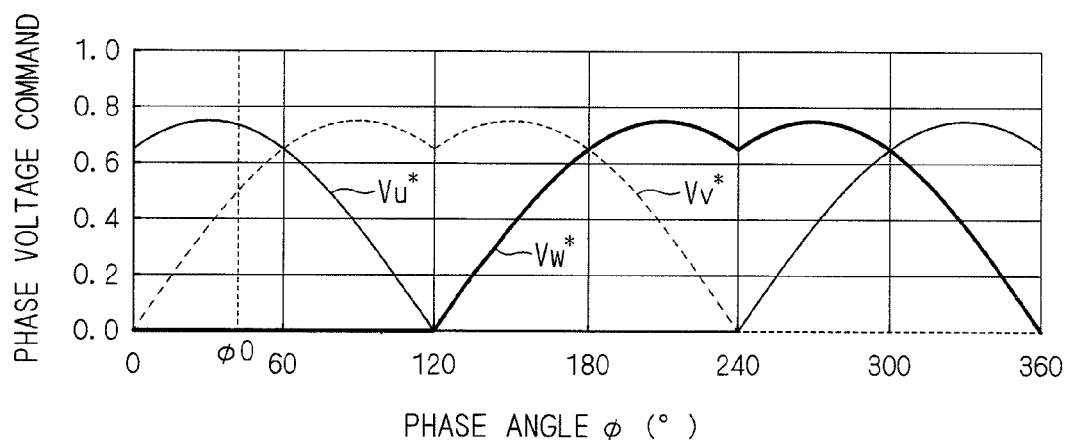
F I G . 3

F I G . 5
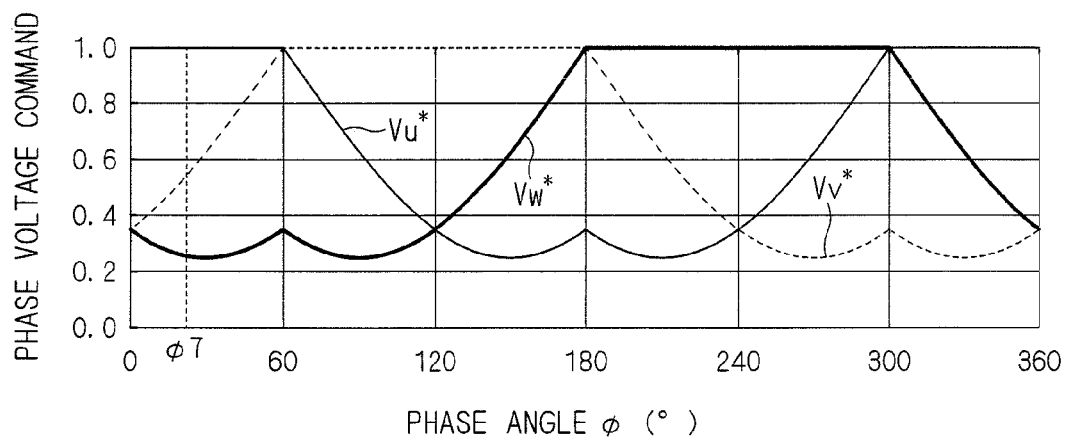

F I G . 7
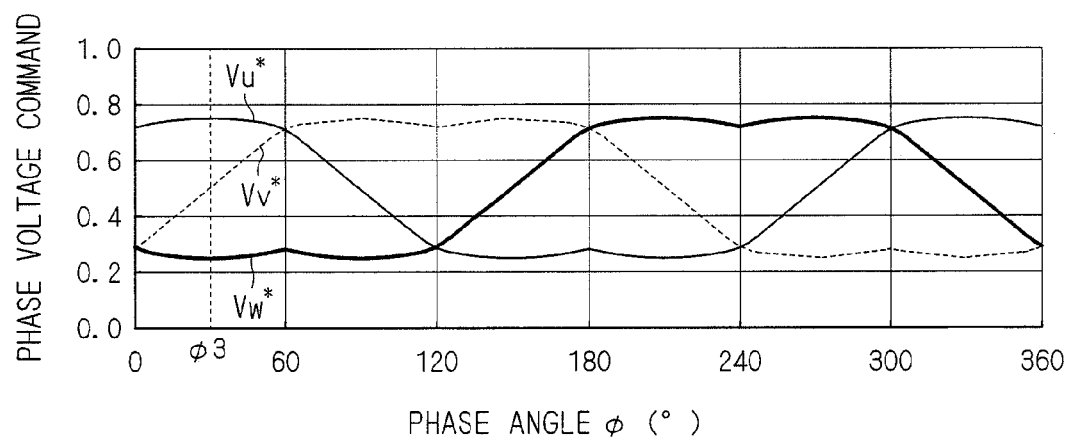

F I G . 1 2
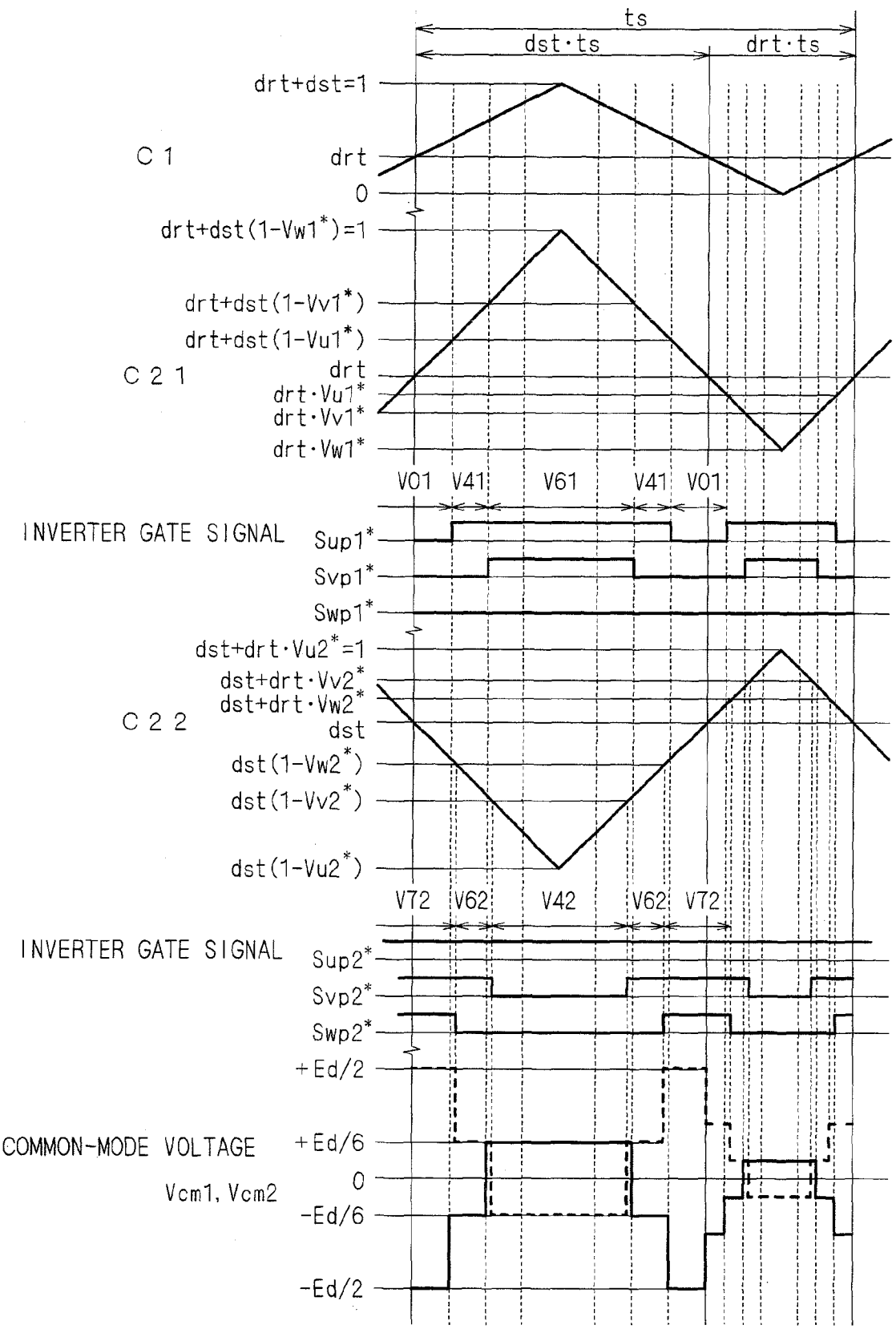

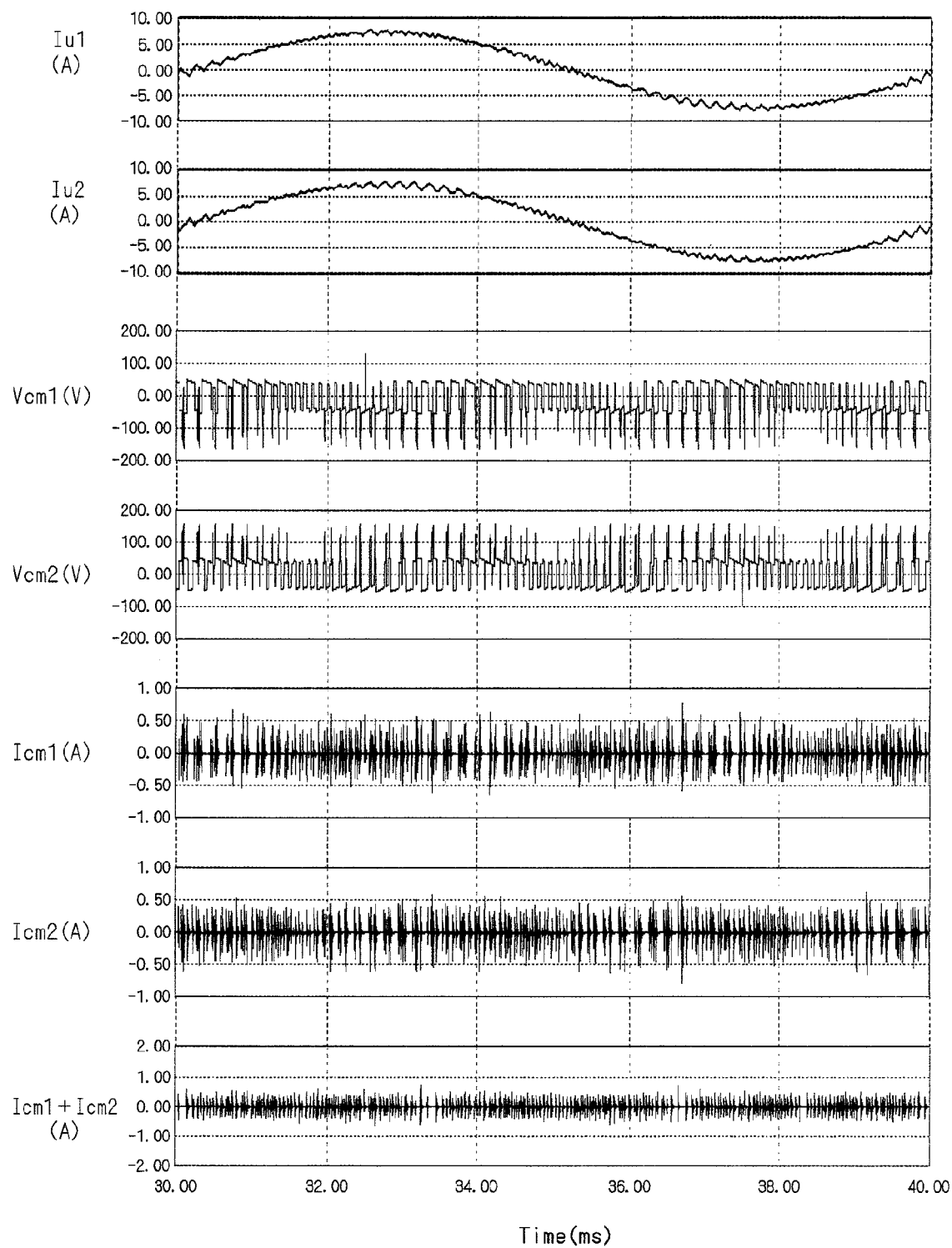
F I G . 1 4

F I G . 1 5
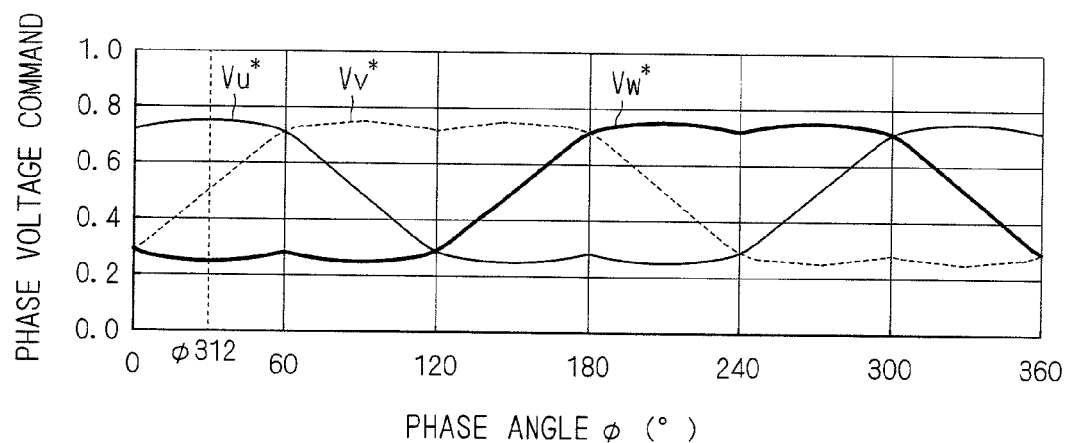

F I G . 1 7
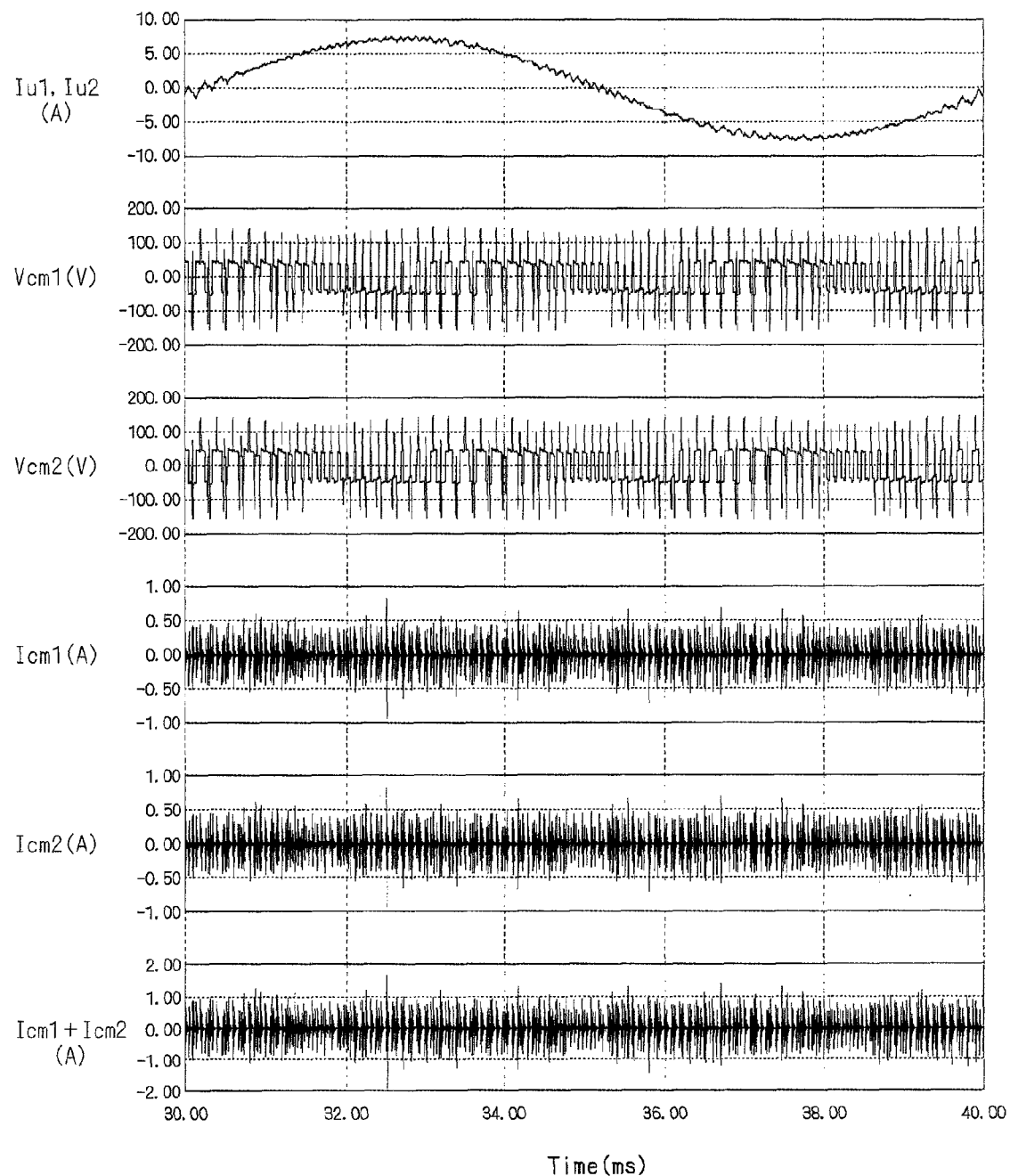

F I G . 2 2
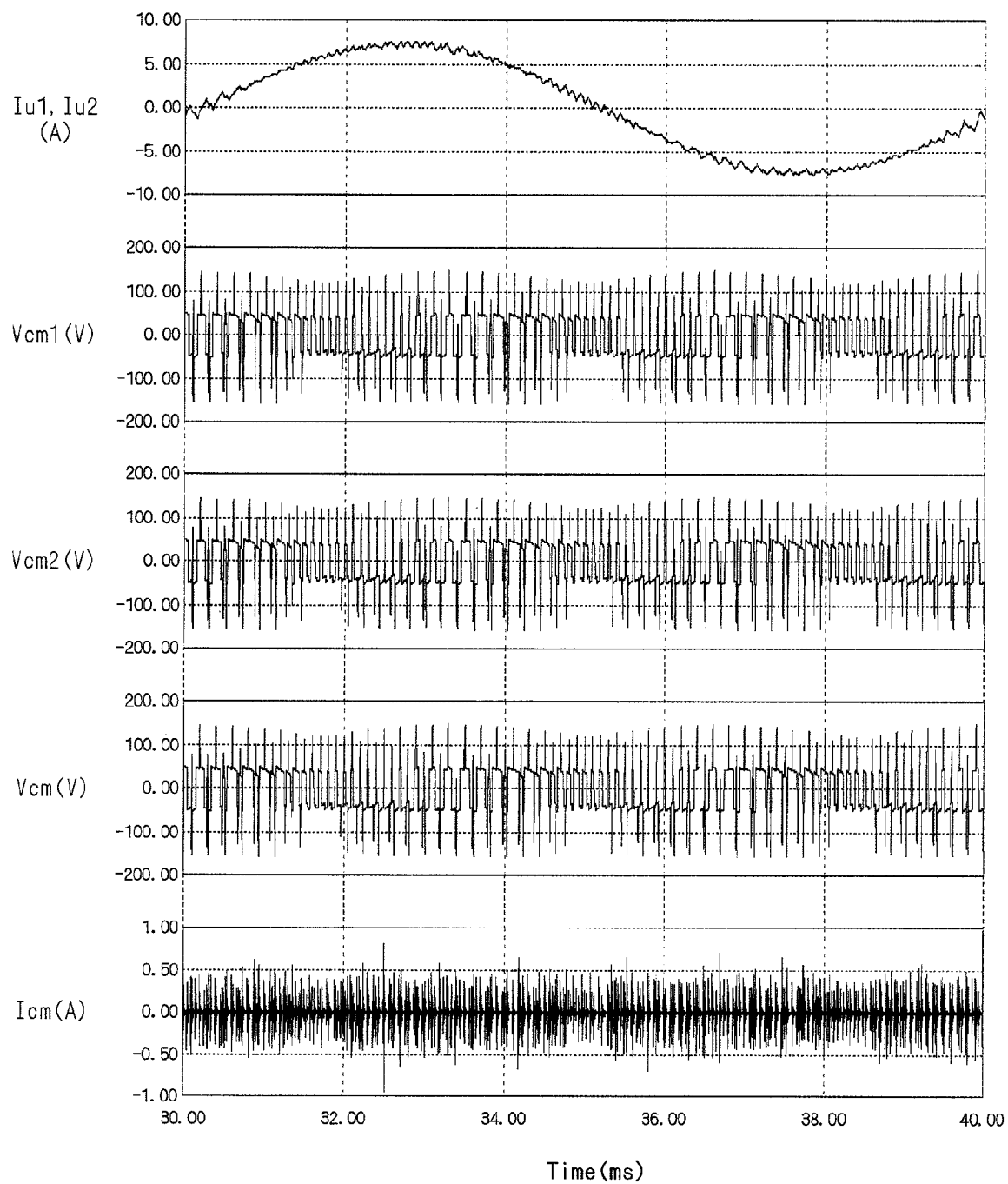

DIRECT-TYPE CONVERTING APPARATUS AND METHOD FOR CONTROLLING THE SAME

TECHNICAL FIELD

The present invention relates to a direct-type converting apparatus, and particularly to a direct-type converting apparatus including a converter and a plurality of inverters.

BACKGROUND ART

In a so-called indirect-type AC power converting apparatus, a large-size capacitor is provided at a so-called DC link between a converter and an inverter. This capacitor has a function to smooth a voltage ripple caused by the commercial frequency. This technique is disclosed in, for example, Japanese Patent Application Laid-Open No. 9-224393 (1997). According to this document, an inverter section for a compressor and an inverter section for a fan are connected in parallel with respect to a smoothing capacitor, to thereby share a power source between both of the inverter sections. In this technique, a DC voltage is shared between both of the inverters, and therefore a control of the fan is corrected in accordance with the DC voltage which varies in accordance with a load of the compressor.

On the other hand, in a direct-type AC power converting apparatus, a large-size capacitor or reactor is not required. Therefore, in this converting apparatus, downsizing can be expected, and in recent years, there has been an increasing interest in it as a next-generation power converting apparatus. For example, in Japanese Patent Application Laid-Open No. 2007-312589, one inverter is connected to one converter. There is introduced a technique (hereinafter, sometimes represented simply as "a commutation in a converter at a zero current") of causing a commutation in the converter when the inverter is operated based on a zero vector and a so-called zero-current state is established. There is also introduced a technique by which a carrier can be shared between the converter and the inverter.

As for the direct-type AC power converting apparatus, a technique has also been proposed in which an operation is performed with a plurality of inverters being connected with respect to one converter for the purpose of increasing an output power capacity. This technique is disclosed in, for example, Kato and Ito, "Improvement of Waveform for a Boost type AC/DC/AC Direct Converter", Institute of Electrical Engineers of Japan, national convention 2007/3/15-17, Part 4, 4-098. In this document, a current-source rectifier can be recognized as a converter, and a DC/DC converter can be recognized as an inverter. The DC/DC converter and a voltage-source inverter are connected in parallel. According to the technique shown in this document, a commutation is caused in the current-source rectifier at a so-called zero current, and thus a plurality of inverters are controlled by a pulse-width modulation by a single carrier synchronized with a carrier based on which the current-source rectifier is operated.

From the viewpoint of increasing an output power capacity, a technique has been proposed in which a plurality of matrix converters are connected in parallel with respect to one LC filter and furthermore are connected in parallel with respect to one load (see Japanese Patent Application Laid-Open No. 2005-65356 and Ayano, Inaba, and Ogasawara, "Reduction Effect of EMI in Parallel Matrix Converter Systems", Journal of IEEJ, D, Vol. 128, No. 3, pp. 184 to 192 (2008)).

Ogasawara, Fujita, and Akagi, "Modeling and Analysis of High-Frequency Leakage Currents Caused by Voltage-Source PWM Inverters", Journal of IEEJ, D, Vol. 115, No. 1, pp. 77 to 83 (1995) mentions a common-mode voltage of an inverter which is controlled by a pulse-width modulation.

Japanese Patent Publication No. 6-81514 (1994) discloses a waveform subjected to a three-phase modulation which will be described later.

DISCLOSURE OF THE INVENTION

Problems to be Solved by the Invention

In the technique disclosed in Japanese Patent Application Laid-Open No. 9-224393 (1997), two inverters are not synchronized with each other, and therefore a concentrated flow of a common-mode current is not likely to occur. On the other hand, in the technique disclosed in Ayano, Inaba, and Ogasawara, "Reduction Effect of EMI in Parallel Matrix Converter Systems", Journal of IEEJ, D, Vol. 128, No. 3, pp. 184 to 192 (2008), a plurality of inverters are controlled in synchronization with one another. Accordingly, if modulation rates of the plurality of inverters are close to one another, a timing when the common-mode current occurs concentrates in a time period in which an operation is performed based on a zero vector. This involves a problem that a prominence of a leakage current may easily occur in a particular operating range.

Therefore, an object of the present invention is to provide a technique of, in a direct-type converting apparatus including a converter and two inverters, avoiding a prominence of a leakage current by reducing a common-mode current while causing a commutation in a converter when both of the inverters are operated based on a zero vector.

Means for Solving the Problems

A method for controlling a direct-type converting apparatus according to the present invention is a method for controlling a direct-type converting apparatus including: a converter (3) rectifying multi-phase AC voltages (Vr, Vs, Vt) and outputting them to a pair of DC power supply lines (L1, L2); and a first inverter (4) and a second inverter (5) being connected in parallel with each other between the pair of DC power supply lines, either of them being operated in a pulse-width modulation according to an instantaneous space vector control.

In a first aspect thereof, a commutation is caused in the converter, when the first inverter is operated based on a first zero vector (V0) while the second inverter is operated based on a second zero vector (V7); and the first zero vector and the second zero vector are different from each other.

A second aspect of the method for controlling a direct-type converting apparatus according to the present invention is the first aspect thereof, wherein: either of the first inverter (4) and the second inverter (5) has a plurality of current paths which are connected in parallel with each other between the pair of DC power supply lines (L1, L2); and each of the current paths includes a pair of switching elements (Sup1, Sun1; Svp1, Svn1; Swp1, Swn1; Sup2, Sun2; Svp2, Svn2; Swp2, Swn2) being connected in series with each other between the pair of DC power supply lines, an output being taken from a connection point between the pair of switching elements.

When the first inverter is operated based on the first zero vector, a first of the pair of switching elements (Sup1, Svp1, Swp1) at one (L1) side of the pair of DC power supply lines is rendered non-conducting while a second of the pair of switching elements (Sun1, Svn1, Swn1) at the other (L2) side of the pair of DC power supply lines is rendered conducting, in any of the current paths of the first inverter.

When the second inverter is operated based on the second zero vector, the first of the pair of switching elements (Sup2, Svp2, Swp2) is rendered conducting while the second of the pair of switching elements (Sup2, Svn2, Swn2) is rendered non-conducting, in any of the current paths of the second inverter.

A third aspect of the method for controlling a direct-type converting apparatus according to the present invention is the first or second aspect thereof, wherein a first carrier (C21) adopted for a control of the first inverter (4) and a second carrier (C22) adopted for a control of the second inverter (5) have phases opposite to each other, have maximum values (dst+drt=1) thereof coincident with each other and have minimum values (0) thereof coincident with each other. The converter (3) is operated in a pulse-width modulation, and a carrier (C1) adopted for a control of the converter is synchronized with the first carrier and the second carrier, and one cycle (ts) thereof is divided by a first value (dst) and a second value (drt) into a first time period (dst·ts) and a second time period (drt·ts) at a timing when the commutation is caused.

In the first time period, (i) a vector (V01, V41, V61) used for the instantaneous space vector control of the first inverter is switched, at a time point when the first carrier takes a value (drt+dst·(1−Vu1*), drt+dst·(1−Vv1*), drt+dst·(1−Vw1*)) which is distant from a value (drt) taken by the first carrier at a start point of the first time period by a value (dst·(1−Vu1*), dst·(1−Vv1*), dst·(1−Vw1*)) obtained by multiplying, by the first value, a value obtained by subtracting from 1 a command value (Vu1*, Vv1*, Vw1*) for the output of the first inverter, and (ii) a vector (V42, V62, V72) used for the instantaneous space vector control of the second inverter is switched, at a time point when the second carrier takes a value (dst·(1−Vu2*), dst·(1·Vv2*), dst·(1−Vw2*)) which is distant from a value (dst) taken by the second carrier at the start point of the first time period by a value (dst·Vu2*, dst·Vv2*, dst·Vw2*) obtained by multiplying, by the first value, a command value (Vu2*, Vv2*, Vw2*) for the output of the second inverter.

In the second time period, (iii) the vector used for the instantaneous space vector control of the first inverter is switched, at a time point when the first carrier takes a value (drt·Vu1*, drt·Vv1*, drt·Vw1*) which is distant from a value (drt) taken by the first carrier at a start point of the second time period by a value (drt·(1−Vu1*), drt·(1−Vv1*), drt·(1−Vw1*)) obtained by multiplying, by the second value, a value obtained by subtracting from 1 the command value (Vu1*, Vv1*, Vw1*) for the output of the first inverter, and (iv) a vector used for the instantaneous space vector control of the second inverter is switched, at a time point when the second carrier takes a value (dst+drt·Vu2*, dst+drt·Vv2*, dst+drt·Vw2*) which is distant from a value (dst) taken by the second carrier at the start point of the second time period by a value (drt·Vu2*, drt·Vv2*, drt·Vw2*) obtained by multiplying, by the second value, a command value (Vu2*, Vv2*, Vw2*) for the output of the second inverter.

A fourth aspect of a method for controlling a direct-type converting apparatus according to the present invention is the third aspect thereof, wherein the output of either of the first inverter (4) and the second inverter (5) exhibits three phases. The command values (Vu1*, Vv1*, Vw1*) for the output of the first inverter are determined by a two-phase modulation in which any one of them continuously takes a minimum value of the first carrier (C21) throughout a time period corresponding to a phase of 120 degrees. The command values (Vu2*, Vv2*, Vw2*) for the output of the second inverter are determined in a two-phase modulation in which any one of them continuously takes a maximum value of the second carrier (C22) throughout a time period corresponding to a phase of 120 degrees.

A fifth aspect of the method for controlling a direct-type converting apparatus according to the present invention is the third aspect thereof, wherein the output of either of the first inverter (4) and the second inverter (5) exhibits three phases. The command values (Vu1*, Vv1*, Vw1*) for the output of the first inverter and the command values (Vu2*, Vv2*, Vw2*) for the output of the second inverter are determined in a three-phase modulation.

A first aspect of a direct-type converting apparatus according to the present invention includes: a converter (3) rectifying multi-phase AC voltages (Vr, Vs, Vt) and outputting them to a pair of DC power supply lines (L1, L2); a first inverter (4) and a second inverter (5) being connected in parallel with each other between the pair of DC power supply lines; a first inverter control section (61) outputting a first control signal (Sup1*, Sun1*; Svp1*, Svn1*; Swp1*, Swn1*) for operating the first inverter in a pulse-width modulation according to an instantaneous space vector control; a second inverter control section (62) outputting a second control signal (Sup2*, Sun2*; Svp2*, Svn2*; Swp2*, Swn2*) for operating the second inverter in a pulse-width modulation according to an instantaneous space vector control; and a converter control section (60) outputting a third control signal (Srp*, Ssp*, Stp*, Srn*, Ssn*, Stn*) for causing a commutation in the converter when the first inverter is operated based on a first zero vector (V0) while the second inverter is operated based on a second zero vector (V7) different from the first zero vector.

A second aspect of the direct-type converting apparatus according to the present invention is the first aspect thereof, wherein: either of the first inverter (4) and the second inverter (5) has a plurality of current paths which are connected in parallel with each other between the pair of DC power supply lines (L1, L2); and each of the current paths includes a pair of switching elements (Sup1, Sun1; Svp1, Svn1; Swp1, Swn1; Sup2, Sun2; Svp2, Svn2; Swp2, Swn2) being connected in series with each other between the pair of DC power supply lines and whose conductions are controlled by the first control signal or the second control signal (Sup1*, Sun1*; Svp1*, Svn1*; Swp1*, Swn1*; Sup2*, Sun2*; Svp2*, Svn2*; Swp2*, Swn2*), an output being taken from a connection point between the pair of switching elements.

When the first inverter is operated based on the first zero vector, a first of the pair of switching elements (Sup1, Svp1, Swp1) at one (L1) side of the pair of DC power supply lines is rendered non-conducting while a second of the pair of switching elements (Sun1, Svn1, Swn1) at the other (L2) side of the pair of DC power supply lines is rendered conducting, in any of the current paths of the first inverter.

When the second inverter is operated based on the second zero vector, the first of the pair of switching elements (Sup2, Svp2, Swp2) is rendered conducting while the second of the pair of switching elements (Sun2, Svn2, Swn2) is rendered non-conducting, in any of the current paths of the second inverter.

A third aspect of the direct-type converting apparatus according to the present invention is the first or second aspect thereof, wherein a first carrier (C21) adopted for a control of the first inverter (4) and a second carrier (C22) adopted for a control of the second inverter (5) have phases opposite to each other, have maximum values (dst+drt=1) thereof coincident with each other, and have minimum values (0) thereof coincident with each other. The converter (3) is operated in a pulse-width modulation, and a carrier (C1) adopted for a control of the converter is synchronized with the first carrier and the second carrier, and one cycle (ts) thereof is divided by a first value (dst) and a second value (drt) into a first time period (dst·ts) and a second time period (drt·ts) at a timing when the commutation is caused.

In the first time period, (i) the first control signal (Sup1*, Sun1*; Svp1*; Svn1*; Swp1*, Swn1*) is switched, at a time point when the first carrier takes a value (drt+dst·(1−Vu1*), drt+dst·(1−Vv1*), drt+dst·(1−Vw1*)) which is distant from a value (drt) taken by the first carrier at a start point of the first time period by a value (dst·(1−Vu1*), dst·(1−Vv1*), dst·(1−Vw1*)) obtained by multiplying, by the first value, a value obtained by subtracting from 1 a command value (Vu1*, Vv1*, Vw1*) for the output of the first inverter, and (ii) the second control signal (Sup2*, Sun2*; Svp2*, Svn2*; Swp2*, Swn2*) is switched, at a time point when the second carrier takes a value (dst·(1−Vu2*), dst·(1−Vv2*), dst·(1−Vw2*)) which is distant from a value (dst) taken by the second carrier at a start point of the first time period by a value (dst·Vu2*, dst·Vv2*, dst·Vw2*) obtained by multiplying, by the first value, a command value (Vu2*, Vv2*, Vw2*) for the output of the second inverter.

In the second time period, (iii) the first control signal is switched, at a time point when the first carrier takes a value (drt·Vu1*, drt·Vv1*, drt·Vw1*) which is distant from a value (drt) taken by the first carrier at a start point of the second time period by a value (drt·(1−Vu1*), drt·(1−Vv1*), drt·(1−Vw1*)) obtained by multiplying, by the second value, a value obtained by subtracting from 1 the command value (Vu1*, Vv1*, Vw1*) for the output of the first inverter, and (iv) the second control signal is switched, at a time point when the second carrier takes a value (dst+drt·Vu2*, dst+drt·Vv2*, dst+drt·Vw2*) which is distant from a value (dst) taken by the second carrier at a start point of the second time period by a value (drt·Vu2*, drt·Vv2*, drt·Vw2*) obtained by multiplying, by the second value, a command value (Vu2*, Vv2*, Vw2*) for the output of the second inverter.

A fourth aspect of the direct-type converting apparatus according to the present invention is the third aspect thereof, wherein: the output of either of the first inverter (4) and the second inverter (5) exhibits three phases; the command values (Vu1*, Vv1*, Vw1*) for the output of the first inverter are determined by a two-phase modulation in which any one of them continuously takes a minimum value of the first carrier (C21) throughout a time period corresponding to a phase of 120 degrees; and the command values (Vu2*, Vv2*, Vw2*) for the output of the second inverter are determined in a two-phase modulation in which any one of them continuously takes a maximum value of the second carrier (C22) throughout a time period corresponding to a phase of 120 degrees.

A fifth aspect of the direct-type converting apparatus according to the present invention is the third aspect thereof, wherein: the output of either of the first inverter (4) and the second inverter (5) exhibits three phases; and the command values (Vu1*, Vv1*, Vw1*) for the output of the first inverter and the command values (Vu2*, Vv2*, Vw1*) for the output of the second inverter are determined in a three-phase modulation.

Effects of the Invention

According to the first aspect of the direct-type converting apparatus and the first aspect of the method for controlling the direct-type converting apparatus according to the present invention, the first zero vector and the second zero vector are different from each other, and therefore even when an expiration of a time period in which the first inverter adopts the first zero vector coincides with an expiration of a time period in which the second inverter adopts the second zero vector, a common-mode current caused by the first inverter and a common-mode current caused by the second inverter cancel out each other, so that the total amount of the common-mode current is reduced.

According to the second aspect of the direct-type converting apparatus and the second aspect of the method for controlling a direct-type converting apparatus according to the present invention, a common-mode voltage of the first inverter and a common-mode voltage of the second inverter transit in opposite manners. Therefore, since the first zero vector and the said second zero vector are different from each other, even though their expirations coincide with each other, the common-mode current caused by the first inverter and the common-mode current caused by the second inverter cancel out each other.

According to the third aspect of the direct-type converting apparatus and the third aspect of the method for controlling a direct-type converting apparatus according to the present invention, the first zero vector and the second zero vector are set in the time period including the timing at which the commutation is caused in the converter.

The fourth aspect of the direct-type converting apparatus and the fourth aspect of the method for controlling a direct-type converting apparatus according to the present invention contribute to realization of the first zero vector and the second zero vector.

The fifth aspect of the direct-type converting apparatus and the fifth aspect of the method for controlling a direct-type converting apparatus according to the present invention contribute to realization of the first zero vector and the second zero vector.

BRIEF DESCRIPTION OF THE DRAWINGS

FIG. 3 is graphs showing waveforms of phase voltage commands;

FIG. 5 is graphs showing waveforms of phase voltage commands;

FIG. 7 is graphs showing waveforms of phase voltage commands;

FIG. 12 is graphs showing waveforms of various signals and voltages;

FIG. 14 is graphs showing inverter currents and common-mode currents;

FIG. 15 is graphs showing waveforms of phase voltage commands;

FIG. 17 is graphs showing inverter currents and common-mode currents;

FIG. 22 is graphs showing inverter currents and common-mode currents; and

EMBODIMENTS FOR CARRYING OUT THE INVENTION

A. Configuration of Direct-type Converting Apparatus

Figure 1:
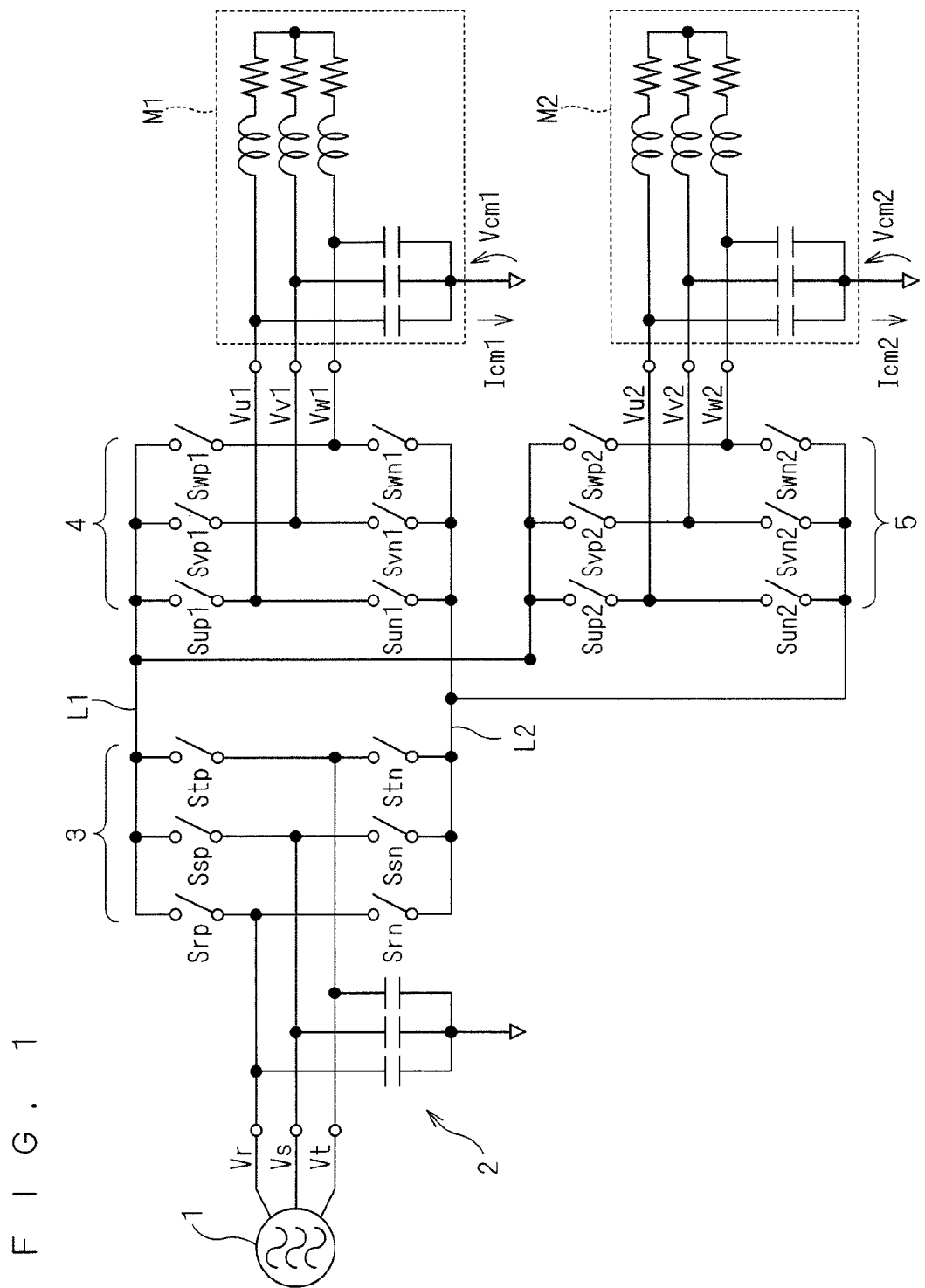
FIG. 1 is a circuit diagram showing a configuration of a direct-type converting apparatus to which embodiments are applicable.

FIG. 1 is a circuit diagram showing a configuration of a direct-type converting apparatus to which embodiments are applicable. The converting apparatus includes a converter 3, inverters 4, 5, and a pair of DC power supply lines L1, L2 which connect the converter 3 and the inverters 4, 5 to each other.

The converter 3 rectifies three-phase (here, R-phase, S-phase, and T-phase) AC voltages Vr, Vs, Vt, and outputs a rectified voltage to the pair of DC power supply lines L1, L2. An input capacitor group 2 may be provided between an AC power source 1 and the converter 3. For example, the input capacitor group 2 includes Y-connected three capacitors which receive multi-phase AC voltages Vr, Vs, Vt.

The converter 3 is a current-source rectifier for example, and operated by a pulse-width modulation. The converter 3 has a plurality of current paths which are connected in parallel with one another between the DC power supply lines L1, L2. One of the current paths of the converter 3 corresponding to the R-phase includes a pair of switching elements Srp, Srn which are connected in series with each other between the DC power supply lines L1, L2. A voltage Vr is applied to a connection point between the switching elements Srp, Srn. One of the current paths of the converter 3 corresponding to the S-phase includes a pair of switching elements Ssp, Ssn which are connected in series with each other between the DC power supply lines L1, L2. A voltage Vs is applied to a connection point between the switching elements Ssp, Ssn. One of the current paths of the converter 3 corresponding to the T-phase includes a pair of switching elements Stp, Stn which are connected in series with each other between the DC power supply lines L1, L2. A voltage Vt is applied to a connection point between the switching elements Stp, Stn.

The switching elements Srp, Ssp, Stp and the switching elements Srn, Ssn, Stn are connected to the DC power supply line L1 side and the DC power supply line L2 side, respectively. Configurations of these switching elements themselves are known, and illustrated in Kato and Ito, "Improvement of Waveform for a Boost type AC/DC/AC Direct Converter", Institute of Electrical Engineers of Japan, national convention 2007/3/15-17, Part 4, 4-098, for example.

The inverters 4, 5 are voltage-source inverters for example, and both of them are operated by a pulse-width modulation according to an instantaneous space vector control (hereinafter simply referred to as a "vector control"). The inverters 4, 5 are connected in parallel with each other between the DC power supply lines L1, L2, and each of them individually outputs a three-phase (here, U-phase, V-phase, and W-phase) AC voltage.

Each of the inverters 4, 5 includes a plurality of current paths which are connected in parallel with one another between the DC power supply lines L1, L2. One of the current paths of the inverter 4 corresponding to the U-phase includes a pair of switching elements Sup1, Sun1 which are connected in series with each other between the DC power supply lines L1, L2. An output voltage Vu1 is obtained from a connection point between the switching elements Sup1, Sun1. One of the current paths of the inverter 4 corresponding to the V-phase includes a pair of switching elements Svp1, Svn1 which are connected in series with each other between the DC power supply lines L1, L2. An output voltage Vv1 is obtained from a connection point between the switching elements Svp1, Svn1. One of the current paths of the inverter 4 corresponding to the W-phase includes a pair of switching elements Swp1, Swn1 which are connected in series with each other between the DC power supply lines L1, L2. An output voltage Vw1 is obtained from a connection point between the switching elements Swp1, Swn1. One of the current paths of the inverter 5 corresponding to the U-phase includes a pair of switching elements Sup2, Sun2 which are connected in series with each other between the DC power supply lines L1, L2. An output voltage Vu2 is obtained from a connection point between the switching elements Sup2, Sun2. One of the current paths of the inverter 5 corresponding to the V-phase includes a pair of switching elements Svp2, Svn2 which are connected in series with each other between the DC power supply lines L1, L2. An output voltage Vv2 is obtained from a connection point between the switching elements Svp2, Svn2. One of the current paths of the inverter 5 corresponding to the W-phase includes a pair of switching elements Swp2, Swn2 which are connected in series with each other between the DC power supply lines L1, L2. An output voltage Vw2 is obtained from a connection point between the switching elements Swp2, Swn2.

The switching elements Sup1, Svp1, Swp1, Sup2, Svp2, Swp2 are connected to the DC power supply line L1 side. Hereinafter, these switching elements are recognized as high-arm side switching elements. The switching elements Sun1, Svn1, Swn1, Sun2, Svn2, Swn2 are connected to the DC power supply line L2 side. Hereinafter, these switching elements are recognized as low-arm side switching elements. Configurations of these switching elements themselves are known, and illustrated in Kato and Ito, "Improvement of Waveform for a Boost type AC/DC/AC Direct Converter", Institute of Electrical Engineers of Japan, national convention 2007/3/15-17, Part 4, 4-098, for example.

The inverters 4, 5 are operated under the vector control. Firstly, as for the inverter 4, operations of the switching elements Sup1, Svp1, Swp1, Sun1, Svn1, Swn1 are controlled based on gate signals Sup1*, Svp1*, Swp1*, Sun1*, Svn1*, Swn1* which are control signals. A description will be given based on an assumption that when these gate signals have the logical value "1"/"0", the corresponding switching elements are rendered conducting/non-conducting. Except a so-called dead time, the values of the gate signals Sup1*, Svp1*, Swp1* and values of the gate signals Sun1*, Svn1*, Swn1*are complementary to each other. That is, using a subscript q to collectively represent the subscripts u, v, w, the exclusive logical sum of the signals Sqp1*, Sqn1* is "1".

The subscript x of the vector Vx (x=integer from 0 to 7) which is adoptable in such a vector control is given by $4 \cdot Sup1^* + 2 \cdot Svp1^* + Swp1^*$. For example, when all of the high-arm side switching elements Sup1, Svp1, Swp1 are non-conducting, all of the low-arm side switching elements Sun1, Svn1, Swn1 are conducting. In this case, x=0 is established, and the inverter 4 is in a vector V0 which is one state of a zero vector.

To the contrary, when all of the high-arm side switching elements Sup1, Svp1, Swp1 are conducting, all of the low-arm side switching elements Sun1, Svn1, Swn1 are non-conducting. In this case, x=7 is established, and the inverter 4 is in a vector V7 which is another state of the zero vector different from the vector V0.

In the inverter 5 as well, a voltage vector is indicated in the same manner. However, in order to distinguish operation states of the inverters 4, 5 from each other, the voltage vector of the inverter 4 is indicated as a vector Vx1 and the voltage vector of the inverter 5 is indicated as a vector Vx2.

Loads M1, M2 are inductive loads, and connected to the inverters 4, 5, respectively. To be specific, the load M1 is a motor having three-phase coils which are Y-connected and to which the voltages Vu1, Vv1, Vw1 are applied. In the same manner, the load M2 is a motor having three-phase coils which are Y-connected and to which the voltages Vu2, Vv2, Vw2 are applied. On the circuit diagram, a resistance component of each of the three-phase coils is shown as a resistor which is connected in series with this coil. Additionally, as for each of the loads M1, M2, a parasitic capacitance with respect to a leakage current path (for example, a casing of the motor) is shown as three Y-connected capacitors.

B. Generation of Gate Signal

Combination of Conventional Techniques

Prior to a detailed description of this embodiment, a more specific description will be given of the fact that only a combination of the technique of Japanese Patent Application Laid-Open No. 2007-312589 and the technique of Kato and Ito, "Improvement of Waveform for a Boost type AC/DC/AC Direct Converter", Institute of Electrical Engineers of Japan, national convention 2007/3/15-17, Part 4, 4-098 causes the problem already mentioned.

Figure 2:
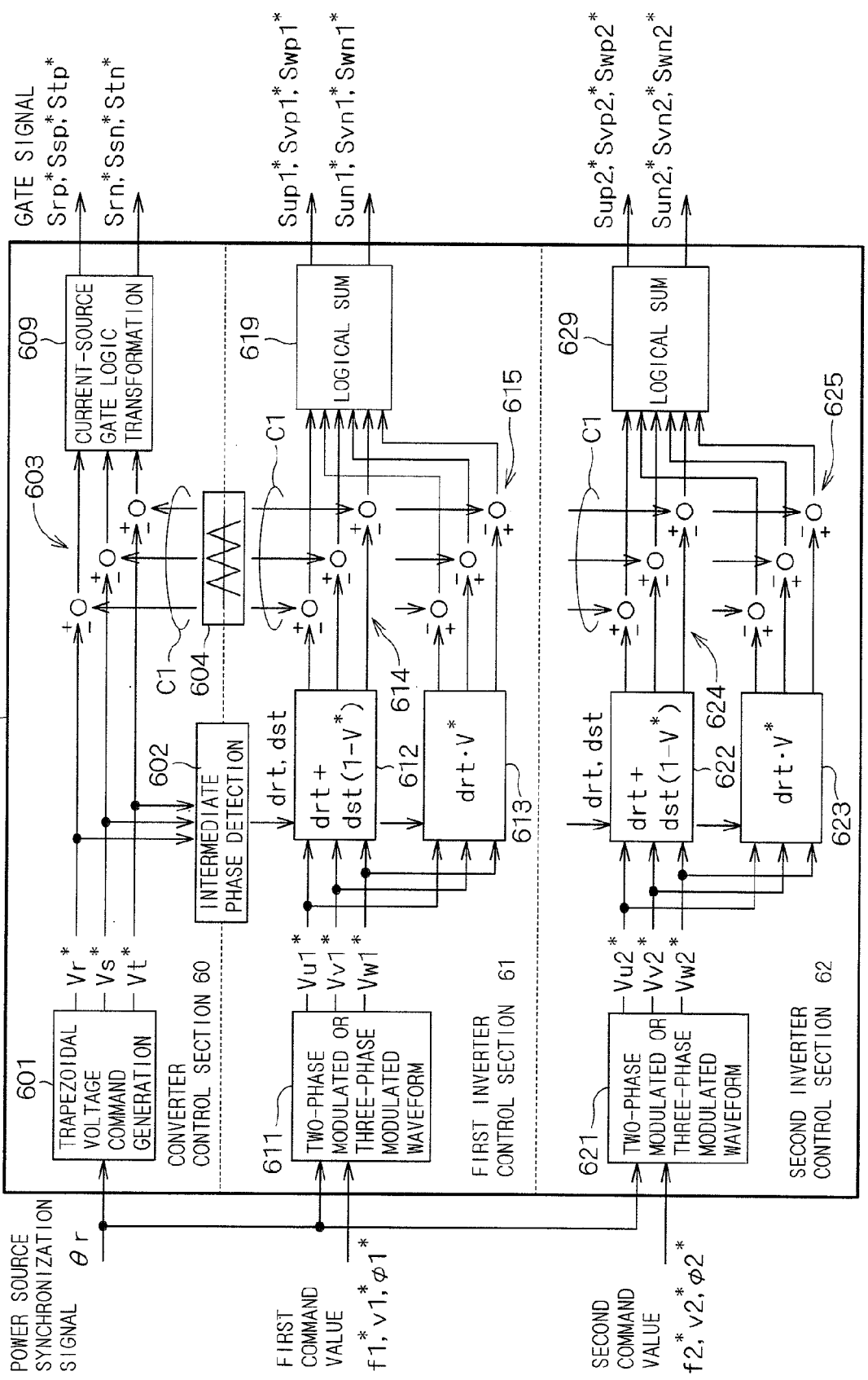
FIG. 2 is a block diagram showing a configuration of a gate signal generation circuit.

FIG. 2 is a block diagram showing a configuration of a gate signal generation circuit 6. The gate signal generation circuit 6 includes a converter control section 60, a first inverter control section 61, and a second inverter control section 62.

To the converter control section 60, a power source synchronization signal (hereinafter simply referred to as an "angle") θr indicating a phase angle of the voltage Vr is inputted as a power source synchronization signal, and the converter control section 60 outputs the gate signals Srp*, Ssp*, Stp*, Srn*, Ssn*, Stn*. These gate signals are control signals for controlling the operations of the respective switching elements Srp, Ssp, Stp, Srn, Ssn, Stn of the converter 3.

To the first inverter control section 61, the angle θr, a command value f1* of an operation frequency of the inverter 4, a voltage command value v1*, and a phase command value φ1* (they will be collectively called a "first command value") are inputted, and the first inverter control section 61 outputs the above-mentioned gate signals Sup1*, Svp1*, Swp1*, Sun1*, Svn1*, Swn1*.

To the second inverter control section 62, the angle θr, a command value f2* of an operation frequency of the inverter 5, a voltage command value v2*, and a phase command value φ2 (they will be collectively called a "second command value") are inputted, and the second inverter control section 62 outputs the gate signals Sup2*, Svp2*, Swp2*, Sun2*, Svn2*, Swn2*. These gate signals control the operations of the respective switching elements Sup2, Svp2, Swp2, Sun2, Svn2, Swn2 of the inverter 5.

The configuration shown as the "control section 3" in Japanese Patent Application Laid-Open No. 2007-312589 is adoptable as the configuration of the converter control section 60 and the first inverter control section 61, or the configuration of the converter control section 60 and the second inverter control section 62. The description given below is slightly different from the technique shown in Japanese Patent Application Laid-Open No. 2007-312589 in terms of the way of expression, and therefore a description will be, though simply, given.

The converter control section 60 includes a trapezoidal voltage command generation section 601, an intermediate phase detection section 602, a comparison section 603, a carrier generation section 604, and a current-source gate logic transformation section 609. These serve the same functions as those of a "trapezoidal voltage command signal generation section 11", an "intermediate phase detection section 14", a "comparison section 12", a "carrier signal generation section 15", and a "current-source gate logic transformation section 13" of Japanese Patent Application Laid-Open No. 2007-312589, respectively.

The trapezoidal voltage command generation section 601 generates voltage commands Vr*, Vs*, Vt* of the converter 3 based on the angle θr and using the voltage Vr as a reference. Each of these voltage commands exhibits a trapezoidal waveform having a cycle of 360 degrees, and these voltage commands are phase-shifted from one another by 120 degrees. This trapezoidal waveform exhibits a trapezoidal wave having a pair of continuous flat zones each having 120 degrees and a pair of inclination regions each having 60 degrees and connecting the pair of flat zones to each other. For example, the inclination region is, when the center thereof is adopted as a reference of the phase and the minimum value and the maximum value (these appear in the flat zone) of this waveform are defined as values 0, 1, represented as $(1-\sqrt{3}\tan\theta)/2$ or $(1+\sqrt{3}\tan\theta)/2$, respectively. Since the method for obtaining the inclination region and advantageous effects thereof are introduced in Japanese Patent Application Laid-Open No. 2007-312589 and additionally, they are not directly related to the present application, a detailed description thereof is omitted.

The intermediate phase detection section 602 selects, from the voltage commands Vr*, Vs*, Vt*, the one having neither the maximum phase which takes the maximum value or the minimum phase which takes the minimum value, in other words, selects the one exhibiting the inclination region. Since the converter 3 is a current-source rectifier, an operation is performed in which, in principle, the high-arm side switching element corresponding to the maximum phase and the high-arm side switching element corresponding to the intermediate phase are alternately rendered conducting while the low-arm side switching element corresponding to the minimum phase is rendered conducting.

In a case where there are diode elements in all of the switching elements, all of the switching elements may sometimes be rendered conducting to perform a rectification by the function of these diode elements. However, since it is not an operation of the pulse-width modulation, the rectifying operation is not included in the consideration herein.

For example, assumed is a case where the voltage commands Vr*, Vt* take the flat zones exhibiting the maximum value and the minimum value, respectively, while the voltage command Vs* takes the inclination region. In the following, if not otherwise specified, it is assumed that the direct-type converting apparatus and the gate signal generation circuit 6 are operated under this condition. Such an assumption is adopted without loss of generality, because the voltage commands Vr*, Vs*, Vt* exhibit the identical waveforms except for the phase shifts.

In such a case, the intermediate phase detection section 602 selects the voltage command Vs*, the ratio between the value Vr*−Vs* (=1−Vs*) and the value Vs*−Vt* (=Vs*) is the ratio between a time period in which the switching element Srp is conducting and a time period in which the switching element Ssp is conducting. That is, a conduction ratio of the converter 3 corresponding to the S-phase is determined by the voltage command Vs* which is selected by the intermediate phase detection section 602. The conduction ratio in a case where the switching element Srp is conducting and the conduction ratio in a case where the switching element Ssp is conducting are represented by the values drt, dst(drt+dst=1), respectively. The intermediate phase detection section 602 outputs the values drt, dst.

The carrier generation section 604 outputs a carrier C1 which takes the minimum value and the maximum value (in the above-described example, 0 and 1, respectively) of the voltage commands Vr*, Vs*, Vt*. For example, the carrier C1 is a triangular wave.

The comparator 603 compares the voltage commands Vr*, Vs*, Vt* with the carrier C1. Based on a result of this comparison, the current-source gate logic transformation section 609 outputs the gate signals Srp*, Ssp*, Stp*, Srn*, Ssn*, Stn*.

The first inverter control section 61 includes a modulated waveform generation section 611, computation sections 612, 613, comparison sections 614, 615, and a logical sum computation section 619. These serve the same functions as those of an "output voltage command signal generation section 21", a "computation sections 22, 23", a "comparison section 24", and a "logical sum computation section 25" of Japanese Patent Application Laid-Open No. 2007-312589, respectively.

The modulated waveform generation section 611 outputs phase voltage commands Vu1*, Vv1*, Vw1*, based on the first command value and the angle θr. These are command values of the output voltages Vu1, Vv1, Vw1. Although not described in detail in Japanese Patent Application Laid-Open No. 2007-312589, the modulated waveform generation section 611 performs a two-phase modulation or a three-phase modulation. Details of these modulations will be described later.

Based on the values drt, dst, the computation sections 612, 613 generate signal waves to be compared with the carrier C1, with respect to the phase voltage commands Vu1*, Vv1*, Vw1*. In order to avoid complication of the drawings, the input of the values drt, dst to the computation section 613 is indicated simply by only the arrow entering the computation section 613 from the above.

In Japanese Patent Application Laid-Open No. 2007-312589, the computations based on the values drt, dst and the phase voltage commands Vu1*, Vv1*, Vw1* are collectively represented by drt+dst·V*, drt(1−V*). This is because the reference character V* collectively represents the voltage vector. On the other hand, in the present application, the reference character V* is used as a collective term of the phase voltage commands Vu1*, Vv1*, Vw1*. Therefore, the computations in the computation sections 612, 613 are collectively represented by drt+dst(1−V*), drt·V*, respectively.

The comparison section 614 compares a result of the computation section 612 with the carrier C1, and the comparison section 615 compares a result of the computation section 613 with the carrier C1. Based on these comparison results, the logical sum computation section 619 outputs the gate signals Sup1*, Svp1*, Swp1*, Sun1*, Svn1*, Swn1*.

In this manner, according to Japanese Patent Application Laid-Open No. 2007-312589, to obtain the gate signal for controlling the converter 3, the trapezoidal wave voltage commands Vr*, Vs*, Vt* are compared with the carrier C1, and to generate the gate signal for controlling the inverter 4, the result of the computation of the conduction ratio of the converter 3 and the phase voltage command of the inverter 4 is compared with the carrier C1. Thereby, a direct conversion is performed while a commutation in the converter 3 is performed in a time period of the zero vector of the inverter 4. Details of the operation are introduced in Japanese Patent Application Laid-Open No. 2007-312589, and thus the details will be omitted.

The second inverter control section 62 includes a modulated waveform generation section 621, computation sections 622, 623, comparison sections 624, 625, and a logical sum computation section 629. These serve the same functions as those of the modulated waveform generation section 611, the computation sections 612, 613, the comparison sections 614, 615, and the logical sum computation section 619 of the first inverter control section 61, respectively. Phase voltage commands Vu2*, Vv2*, Vw2* outputted by the modulated waveform generation section 621 are command values of the output voltages Vu2, Vv2, Vw2.

As above, the gate signal generation circuit 6 shown in FIG. 2 adopts a configuration in which the number of only the "inverter control section" in the "control section 3" shown in Japanese Patent Application Laid-Open No. 2007-312589 is simply increased by one.

In this configuration, as introduced by Kato and Ito, "Improvement of Waveform for a Boost type AC/DC/AC Direct Converter", Institute of Electrical Engineers of Japan, national convention Mar. 17, 2007, Part 4, 4-098, to render all of the low-arm side switching elements of the inverter conducting (accordingly, render all of the high-arm side switching elements non-conducting) to realize the zero vector V0, the modulated waveform generation sections 611, 621 generate the phase voltage commands which will then be described.

FIG. 3 depicts graphs showing waveforms of the phase voltage commands Vu*, Vv*, Vw*. The phase voltage command Vu*, the phase voltage command Vv*, and the phase voltage command Vw* collectively represent the phase voltage commands Vu1*, Vu2*, the phase voltage commands Vv1*, Vv2*, and the phase voltage commands Vw1*, Vw2*, respectively.

The phase voltage commands Vu*, Vv*, Vw* exhibit waveforms each having a cycle of 360 degrees and phase-shifted from one another by 120 degrees. These waveforms exhibit waveforms of a so-called two-phase modulation in which any one of the phases continuously takes the minimum value 0 throughout 120 degrees while the other two phases vary. This minimum value is set equal to the minimum value of the carrier C1.

For example, using a phase angle φ, the phase voltage command Vv* takes a value K·sin φ at $0 \leq \phi \leq 120°$, takes a value K·sin(240°−φ) at $120° \leq \phi \leq 240°$, and takes a value 0 at $240° \leq \phi \leq 360°$. A coefficient K is determined depending on the voltage command values v1*, v2*.

Here, a case where the first command value and the second command value are the same is assumed as a typical case where a problem occurs. In this case, the phase voltage commands Vu1*, Vv1*, Vw1* coincide with the phase voltage commands Vu2*, Vv2*, Vw2*. The first inverter control section 61 and the second inverter control section 62 share the values drt, dst, and also share the carrier C1, and therefore the gate signals Sup1*, Svp1*, Swp1*, Sun1*, Svn1*, Swn1* coincide with the gate signals Sup2*, Svp2*, Swp2*, Sun2*, Svn2*, Swn2*, respectively.

Figure 4:
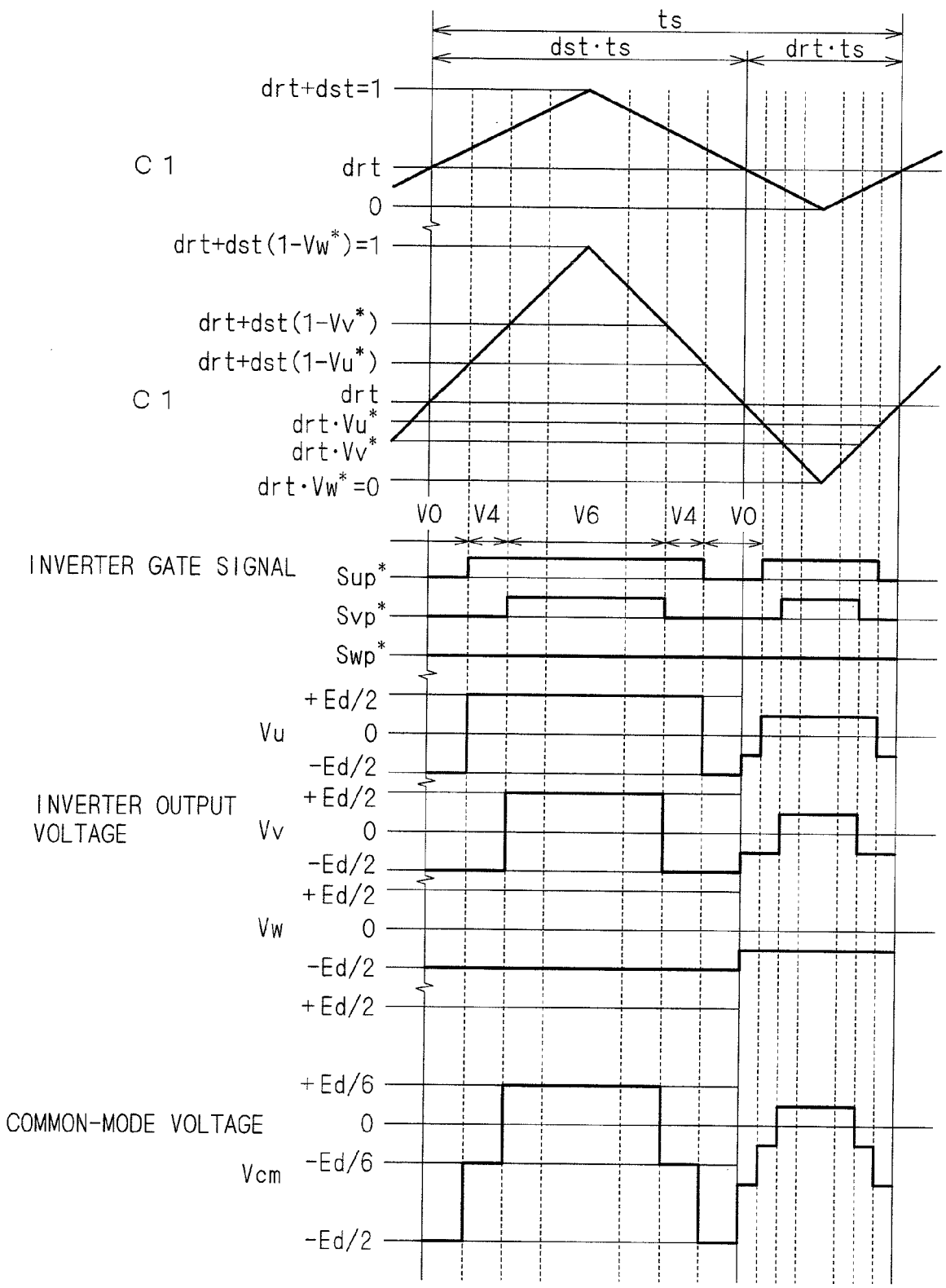
FIG. 4 is graphs showing waveforms of various signals and voltages.

FIG. 4 depicts graphs showing waveforms of the carrier C1, the gate signals (indicated as "INVERTER GATE SIGNAL" in FIG. 4; the same is true in the following description) for the inverters 4, 5, the output voltages (indicated as "INVERTER OUTPUT VOLTAGE" in FIG. 4; the same is true in the following description) for the inverters 4, 5, and the common-mode voltage, in such a case. However, since the first command value and the second command value are the same and there is no difference between the waveforms of the inverters 4, 5, the subscripts 1, 2 are not attached to the respective reference characters.

The carrier C1 is also adopted for the control of the inverters 4, 5. Its one cycle is divided into a time period dst·ts and a time period drt·ts by the values dst, drt which represent a commutation ratio. At a timing of the division, the commutation is performed. As described above, the minimum value and the maximum value of the carrier C1 are 0 and 1, respectively, and dst+drt=1 is established. Accordingly, to be specific, the commutation in the converter 3 is performed at a timing when the carrier C1 takes the value drt.

Around this timing, in order that the inverters 4, 5 take the zero vector V0, the signal wave and the carrier C1 are compared with each other. FIG. 4 shows a case where the phase command values φ1*, φ2* takes the phase angle φ0 (0<φ0<60°) shown in FIG. 3, and the relationship of Vw*=0<Vv<Vu* is satisfied.

The computation sections 612, 622 generate command values drt+dst·(1−Vw*)=1, drt+dst·(1−Vv*), drt+dst·(1−Vu*), and the computation sections 613, 623 generate command values drt·Vu*, drt·Vv*, drt·Vw*=0. Based on the comparison between these command values and the carrier C1, timings of switching vectors V0, V4, V6 are determined Since a time period in which the zero vector V0 is adopted includes the timing of the commutation in the converter 3, the commutation in the converter 3 at a so-called zero current can be realized.

In the time period dst·ts, the voltage of the maximum phase and the voltage of the minimum phase are applied to the DC power supply lines L1, L2, respectively. When a peak-to-peak value of the inverter output voltage is defined as Ed, common-mode voltages Vcm1, Vcm2 (see FIG. 1: potentials of neutral points at which the parasitic capacitances are Y-connected) in the respective loads M1, M2 are Vcm1=Vcm2=Vcm=−Ed/2, referring to Ogasawara, Fujita, and Akagi, "Modeling and Analysis of High-Frequency Leakage Currents Caused by Voltage-Source PWM Inverters", Journal of IEEJ, D, Vol. 115, No. 1, pp. 77 to 83 (1995). When the voltage vector adopts the vector V4, the common-mode voltage Vcm is −Ed/6, and when the voltage vector adopts the vector V6, the common-mode voltage Vcm is +Ed/6.

In the time period drt·ts, the voltage of the intermediate phase and the voltage of the minimum phase are applied to the DC power supply lines L1, L2, respectively. Thus, the inverter output voltage and the common-mode voltage are lower than the values thereof in the time period dst·ts. The drawing is shown based on a virtual neutral point between the DC power supply lines L1, L2, similarly to a virtual neutral point shown in Ogasawara, Fujita, and Akagi, "Modeling and Analysis of High-Frequency Leakage Currents Caused by Voltage-Source PWM Inverters", Journal of IEEJ, D, Vol. 115, No. 1, pp. 77 to 83 (1995). Therefore, at the time of the commutation in the converter 3, level differences occur in the inverter output voltage and the common-mode voltage.

Under the above-described control, the variations of the common-mode voltages Vcm1, Vcm2 occur simultaneously, and therefore a leakage current (hereinafter referred to as a "common-mode current") increases. Although it is not so significant as when the first command value and the second command value are the same as described above, in a case where the modulation rates of the inverters 4, 5 are close to each other, timings of occurrence of the common-mode current are concentrated in a time period in which the operation is performed based on the zero vector V0.

This problem also occurs when the vector V7 which is another zero vector is adopted. FIG. 5 depicts graphs showing other waveforms of the phase voltage commands Vu*, Vv*, Vw*. They exhibit waveforms each having a cycle of 360 degrees and phase-shifted from one another by 120 degrees. These waveforms exhibit waveforms of a so-called two-phase modulation in which any one of the phases continuously takes the maximum value 1 throughout 120 degrees while the other two phases vary. This maximum value is set equal to the maximum value of the carrier C1.

For example, using the phase angle φ, the phase voltage command Vu* takes the value 1 at 0°≤φ≤60° and 300°≤φ≤360°, takes a value K·sin(φ−60°)+1 at 60°≤φ≤180°, and takes a value K·sin(300°−φ)+1 at 180°≤φ≤300°. The coefficient K is determined depending on the voltage command values v1*, v2*.

In the phase voltage command shown in FIG. 5, which of the phase voltage commands adopts the maximum phase, the intermediate phase, and the minimum phase is not different from in the phase voltage commands shown in FIG. 3. That is, the fact that the relationship of Vw*<Vv*<Vu* is established at 0°≤φ≤60° applies equally to the phase voltage commands shown in FIG. 3 and the phase voltage commands shown in FIG. 5.

Figure 6:
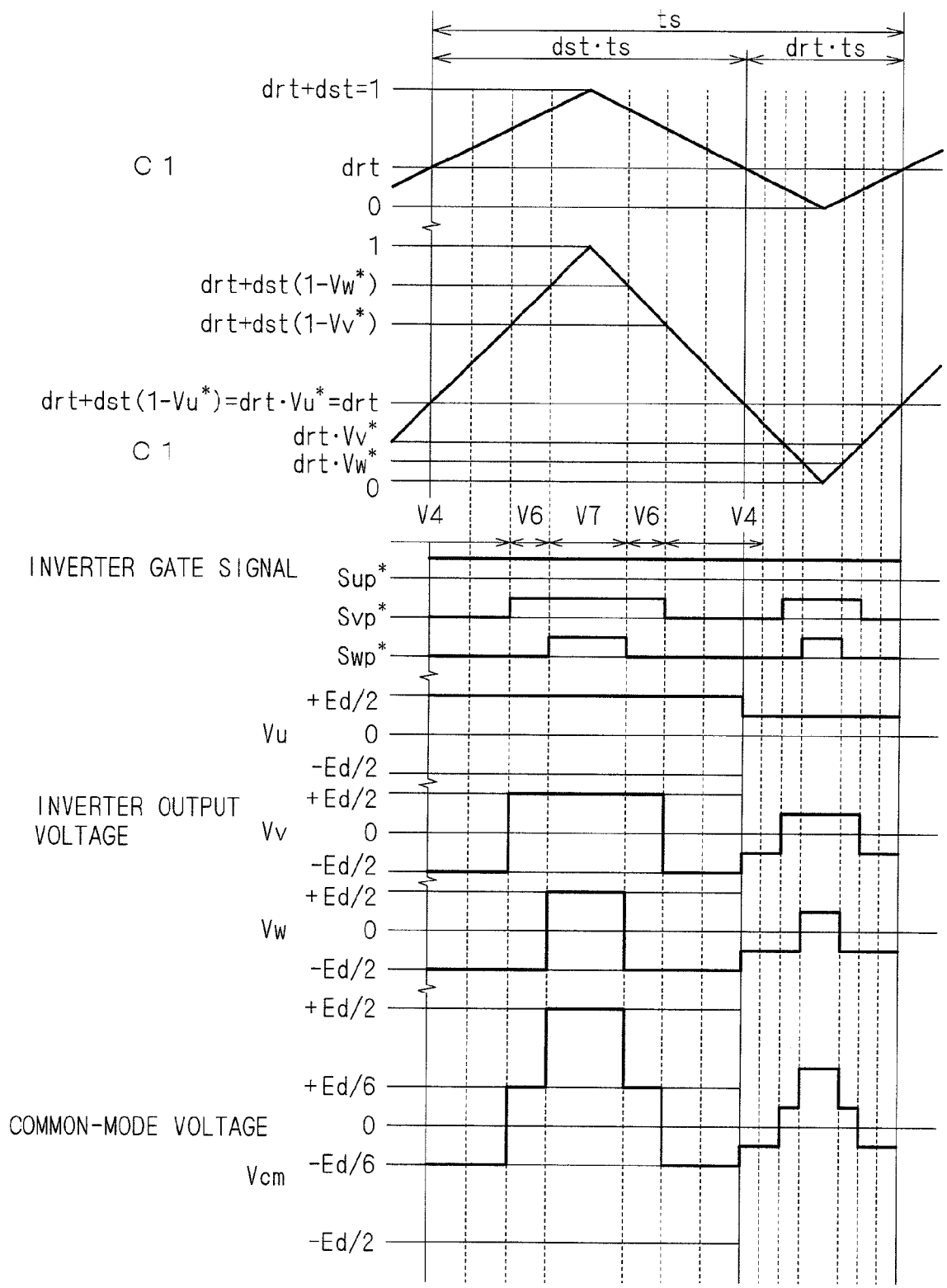
FIG. 6 is graphs showing waveforms of various signals and voltages.

FIG. 6 depicts graphs showing waveforms of the carrier C1, the inverter gate signals, the inverter output voltages, and the common-mode voltage in this case. FIG. 6 shows an exemplary case where the phase command values φ1*, φ2* take the phase angle φ7 (0°<φ7<60°) shown in FIG. 3, and the relationship of Vw*<Vv*<Vu*=1 is satisfied.

In this case as well, in the time period dst·ts, when the voltage vector adopts the vector V4, the common-mode voltage Vcm is −Ed/6, and when the voltage vector adopts the vector V6, the common-mode voltage Vcm is +Ed/6. However, in the case shown in FIG. 5, the vector V7 is adopted as the zero vector, and at this time, the common-mode voltage Vcm is +Ed/2.

Therefore, when the vector V7 is adopted as the zero vector, the timings of occurrence of the common-mode current cannot be distributed, as compared with when the vector V0 is adopted. On the contrary, a time period in which the inverters 4, 5 take the zero vector V7 and a timing at which the commutation is caused in the converter 3 are not coincident with each other, and even the commutation in the converter 3 at the so-called zero current cannot be realized.

Therefore, a case where a vector control which can adopt both of the zero vectors V0 and V7 is employed will be further considered.

FIG. 7 depicts graphs showing waveforms of the phase voltage commands Vu*, Vv*, Vw*. The phase voltage commands Vu*, Vv*, Vw* increase and decrease while being centered at the value 0.5, and these phase voltage commands can be obtained by performing a so-called three-phase modulation on a three-phase sine wave. These waveforms can be obtained by shifting, to 0.5, a central value of "each of new phase voltage commands" indicated using the equation (3) of Japanese Patent Publication No. 6-81514 (1994), for example.

In the phase voltage commands shown in FIG. 7, which of the phase voltage commands adopts the maximum phase, the intermediate phase, and the minimum phase is not different from in the phase voltage commands shown in FIG. 3 and FIG. 5. That is, the fact that the relationship of Vw*<Vv*<Vu* is established at $0° \leq \phi \leq 60°$ applies equally to the phase voltage commands shown in FIG. 3 and the phase voltage commands shown in FIG. 5. However, the minimum value is greater than 0, and the maximum value is smaller than 1.

Figure 8:
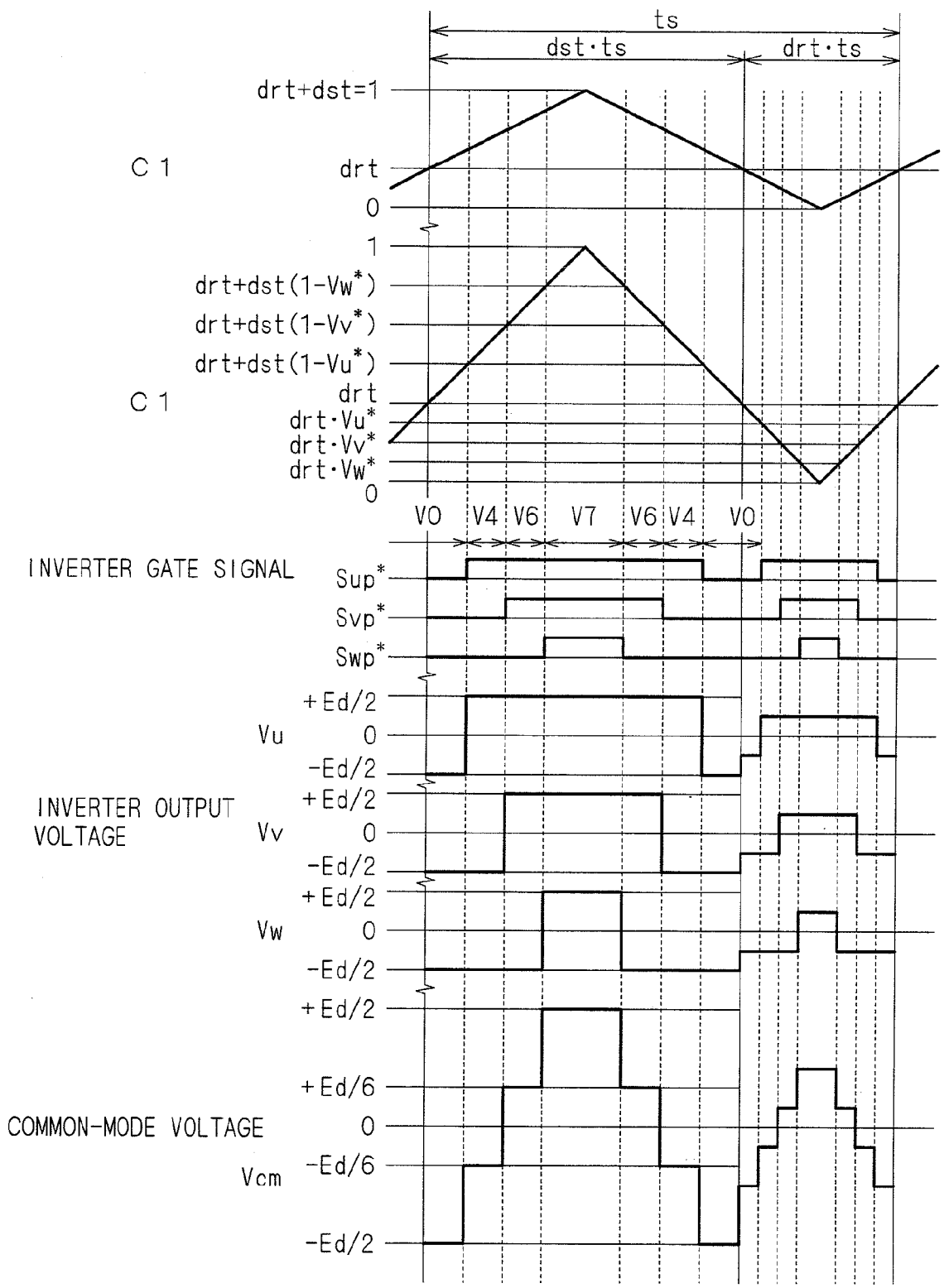
FIG. 8 is graphs showing waveforms of various signals and voltages.

FIG. 8 depicts graphs showing waveforms of the carrier C1, the inverter gate signals, the inverter output voltages, and the common-mode voltage in this case. FIG. 8 shows an exemplary case where the phase command values $\phi 1^*$, $\phi 2^*$ take the phase angle $\phi 3$ ($0° < \phi 3 < 60°$) shown in FIG. 3, and the relationship of Vw*<Vv*<Vu* is satisfied.

In this case, the zero vector V0 can be provided in a time period including the timing at which the commutation is caused in the converter 3. However, it is similar to a case where another waveform of the phase voltage command is used, in that, in the time period dst·ts, when the voltage vector adopts the vector V0, the common-mode voltage Vcm is −Ed/2; when the voltage vector adopts the vector V4, the common-mode voltage Vcm is −Ed/6; when the voltage vector adopts the vector V6, the common-mode voltage Vcm is +Ed/6; and when the voltage vector adopts the vector V7, the common-mode voltage Vcm is +Ed/2.

Eventually, it can be understood that even though the waveform of the phase voltage command is devised, simply combining the technique of Japanese Patent Application Laid-Open No. 2007-312589 and the technique of Kato and Ito, "Improvement of Waveform for a Boost type AC/DC/AC Direct Converter", Institute of Electrical Engineers of Japan, national convention Mar. 15-17, 2007, Part 4, 4-098 cannot solve the problem already mentioned above.

Moreover, as shown in Japanese Patent Application Laid-Open No. 2005-65356 and Ayano, Inaba, and Ogasawara, "Reduction Effect of EMI in Parallel Matrix Converter Systems", Journal of IEEJ, D, Vol. 128, No. 3, pp. 184 to 192 (2008), a combination with a method of using a pair of carriers having opposite phases and comparing with them using the same command value cannot solve the problem already mentioned above, either. The fact that a timing at which the common-mode voltage varies can be shifted by such a combination cannot necessarily satisfy the limitation that the inverters 4, 5 have to be operated based on the zero vector at the time when the commutation is caused in the converter 3.

C. Generation of Gate Signal According to this Embodiment

Figure 9:
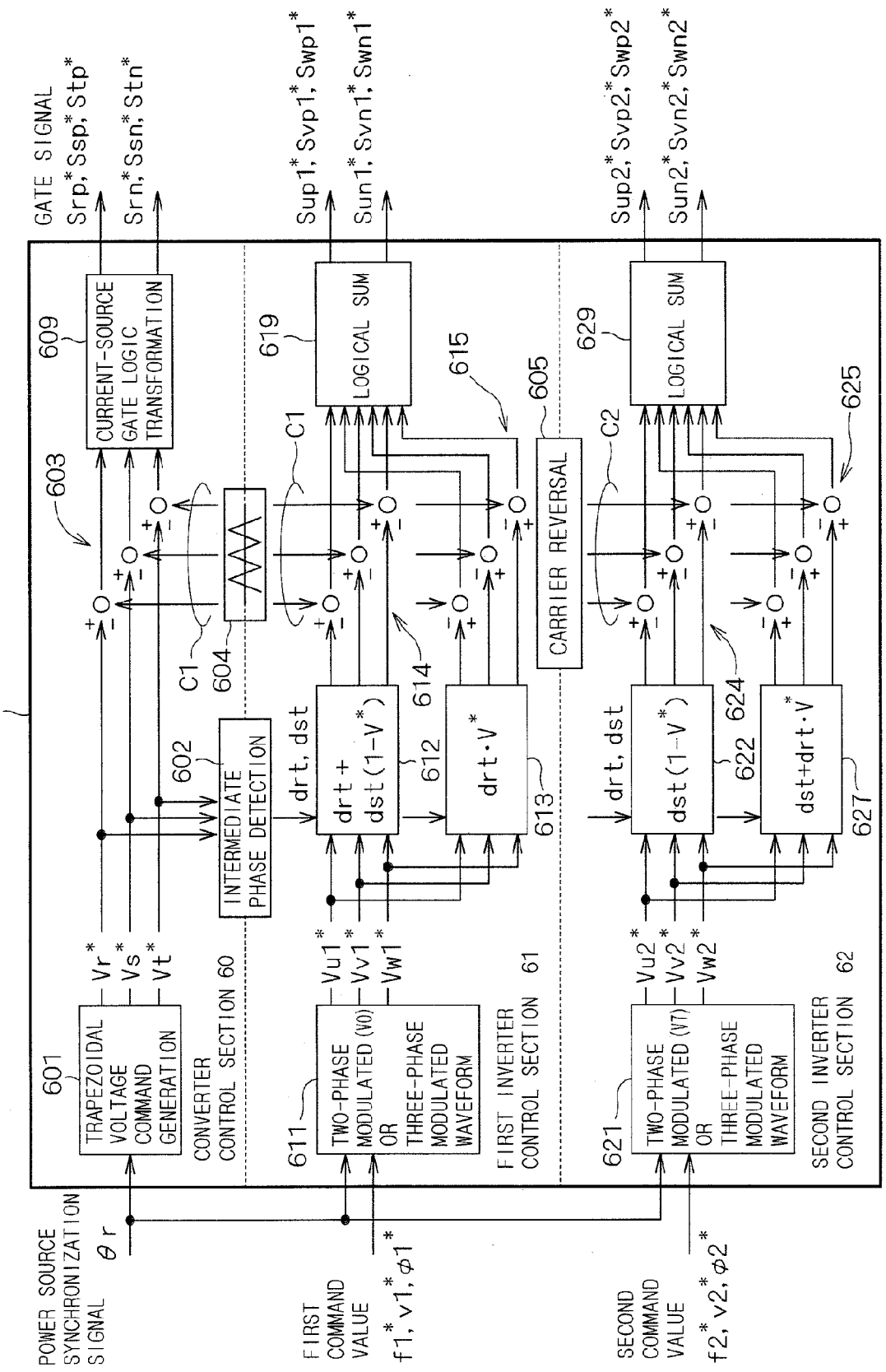
FIG. 9 is a block diagram showing a configuration of a gate signal generation circuit according to this embodiment.

FIG. 9 is a block diagram showing a configuration of the gate signal generation circuit 6 which generates a gate signal according to this embodiment. The gate signal generation circuit 6 is characteristically different from the gate signal generation circuit 6 shown in FIG. 1, in terms of the following points.

First, the computation sections 622, 623 are replaced with computation sections 626, 627, respectively. The computation section 626 generates command values dst·(1−Vu*)=1, dst·(1−Vv*), dst·(1−Vw*), and the computation section 627 generates command values dst+drt·Vu*, dst+drt·Vv*, dst+drt·Vw*=0.

Second, a carrier reversal section 605 is provided. The carrier reversal section 605 generates a carrier C2 which is the reversal of the carrier C1 generated by the carrier generation section 604.

Third, along with the first and second characteristics mentioned above, the comparison sections 624, 625 compare the carrier C2 and the command value generated by the computation sections 626, 627.

Figure 10:
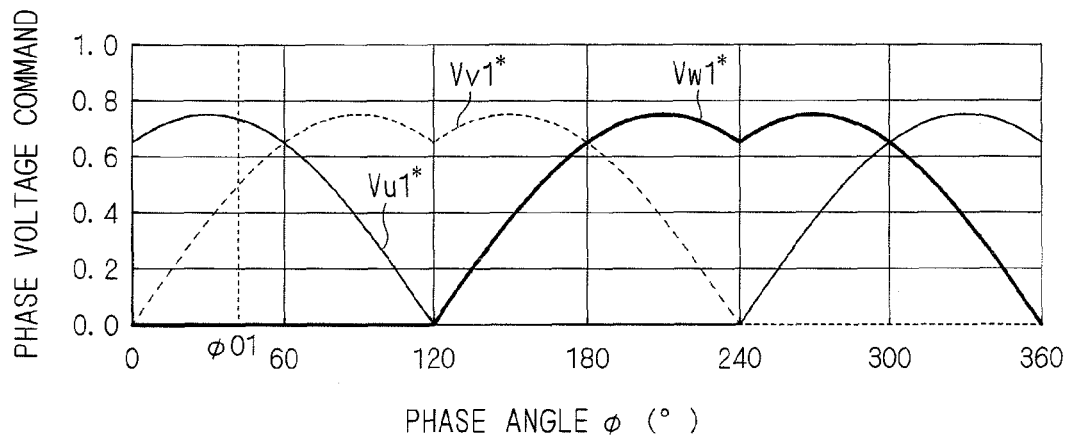
FIG. 10 is graphs showing waveforms of phase voltage commands.
Figure 11:
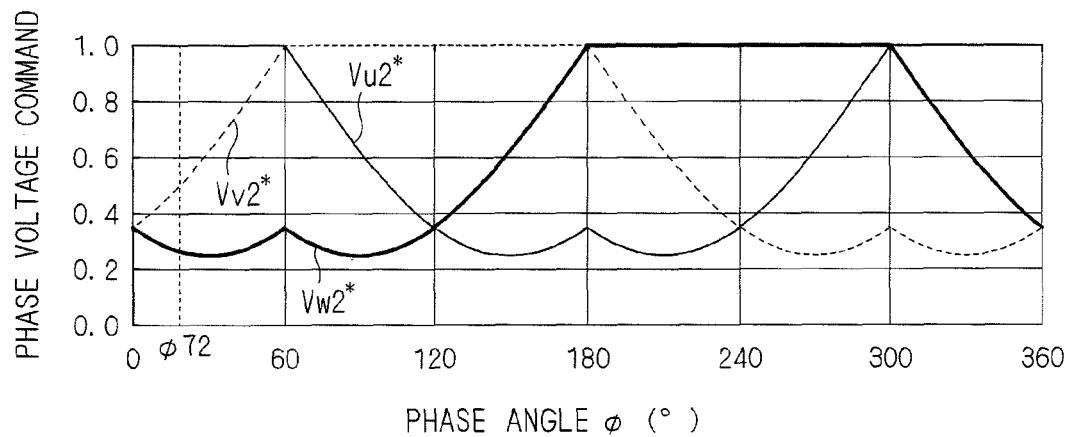
FIG. 11 is graphs showing waveforms of phase voltage commands.

FIG. 10 depicts graphs showing waveforms of the phase voltage commands Vu1*, Vv1*, Vw1*, and here, the waveforms themselves are identical to those of the phase voltage commands Vu*, Vv*, Vw* shown in FIG. 3. Also, FIG. 11 depicts graphs showing waveforms of the phase voltage commands Vu2*, Vv2*, Vw2*, and here, the waveforms themselves are identical to those of the phase voltage commands Vu*, Vv*, Vw* shown in FIG. 5.

FIG. 12 depicts graphs showing waveforms of the carrier C1 on which the operation of the converter 3 relies, the carriers C21, C22 on which the operations of the respective inverters 4, 5 rely, the inverter gate signals of the respective inverters 4, 5, and the common-mode voltages Vcm1, Vcm2. FIG. 12 shows an exemplary case where the phase command values $\phi 1^*$, $\phi 2^*$ adopt phase angles $\phi 01$, $\phi 72$ (either of which is more than 0° and less than 60°) shown in FIG. 10 and FIG. 11, respectively, and the relationship of 0=Vw1*<Vv1*<Vu1*, Vw2*<Vv2*<Vu2*=1 is satisfied.

The carriers C1, C2 are adoptable as the carriers C21, C22, respectively. Needless to say, it can be recognized that either of the carriers C21, C22 is synchronized with the carrier C1. Phases of the carriers C21, C22 are opposite phases to each other, but their maximum values (dst+drt=1) coincide with each other and their minimum value (0) coincide with each other.

The computation section 612 generates signal waves drt+dst·(1−Vu1*), drt+dst·(1−Vv1*), drt+dst·(1−Vw1*) in the manner already described. The computation section 613 generates signal waves drt·Vu1*, drt·Vv1*, drt·Vw1* in the manner already described.

The carrier C21 takes the value drt at a start point of the time period dst·ts. Therefore, using this value as a reference, in the inverter 4, the voltage vector is switched and adopted in the manner described below in the time period dst·ts.

(i) At a time point when the carrier C21 takes a value drt+dst·(1−Vu1*) which is distant from the value drt by a value dst·(1−Vu1*), the voltage vector switches between a vector V01 and a vector V41, and adopts it. At a time point when the carrier C21 takes a value drt+dst·(1−Vv1*) which is distant from the value drt by a value dst·(1−Vv1*), the voltage vector switches between a vector V41 and a vector V61, and adopts it. At a time point when the carrier C21 takes a value drt+dst·(1−Vw1*) which is distant from the value drt by a value dst·(1−Vw1*), the voltage vector switches between a vector V61 and a vector V71 (not shown), and adopts it. However, in a phase $\phi 01$ currently considered, the phase voltage command Vw1 is 0, and therefore the voltage vector is substantially not switched at the value drt+dst·(1−Vw1*)=1, and the vector V61 is maintained.

Since the carriers C21, C22 have the above-described relationship with each other, the carrier C22 takes the value dst (=1−drt) at the start point of the time period dst·ts. Thus, using this value as a reference, in the inverter 5, the voltage vector is switched and adopted in the manner described below in the time period dst·ts.

(ii) At a time point when the carrier C22 takes a value dst·(1−Vw2*) which is distant from the value dst by a value dst·Vw2*, the voltage vector switches between vectors V72 and V62, and adopts it. At a time point when the carrier C22 takes a value dst·(1−Vv2*) which is distant from the value dst by a value dst·Vv2*, the voltage vector switches between vectors V62 and V42, and adopts it. At a time point when the carrier C22 takes a value dst·(1−Vu2*) which is distant from the value dst by a value dst·Vu2*, the voltage vector switches between vectors V42 and V02 (not shown), and adopts it. However, in the phase φ72 currently considered, the phase voltage command Vu2* is 1, and therefore the voltage vector is substantially not switched at the value dst·(1−Vu2*)=0, and the vector V42 is maintained.

The carrier C21 also takes the value drt at the start point of the time period drt·ts. Thus, using this value as a reference, in the inverter 4, the voltage vector is switched and adopted in the manner described below in the time period drt·ts (the voltage vector is not shown for avoiding complication of the drawing).

(iii) At a time point when the carrier C21 takes a value drt·Vu1* which is distant from the value drt by a value drt·(1−Vu1*), the voltage vector switches between the vector V01 and the vector V41, and adopts it. At a time point when the carrier C21 takes a value drt·Vv1* which is distant from the value drt by a value drt·(1−Vv1*), the voltage vector switches between the vector V41 and the vector V61, and adopts it. At a time point when the carrier C21 takes a value drt·Vw1* which is distant from the value drt by a value drt·(1−Vw1*), the voltage vector switches between the vector V61 and the vector V71, and adopts it. However, in the phase φ01 currently considered, the phase voltage command Vw1* is 0, and therefore the voltage vector is substantially not switched at the value drt·Vw1*=0, and the vector V61 is maintained.

(iv) At a time point when the carrier C22 takes a value dst+drt·Vw2* which is distant from the value dst by a value drt·Vw2*, the voltage vector switches between the vector V72 and V62, and adopts it. At a time point when the carrier C22 takes a value dst+drt·Vv2* which is distant from the value dst by a value drt·Vv2*, the voltage vector switches between vectors V62 and V42, and adopts it. At a time point when the carrier C22 takes a value dst+drt·Vu2* which is distant from the value dst by a value drt·Vu2*, the voltage vector switches between the vectors V42 and V02, and adopts it. However, in the phase φ72 currently considered, the phase voltage command Vu2* is 1, and therefore the voltage vector is substantially not switched at the value dst+drt·Vu2*=1, and the vector V42 is maintained.

This switching of the voltage vector is, specifically, realized by switching of the inverter gate signal. For example, in a case where the voltage vector switches from the vector V01 to the vector V41, the inverter gate signals Svp1*, Svn1*, Swp1*, Swn1* maintains OFF, ON, OFF, and ON states, respectively, while the inverter gate signals Sup1*, Sun1* are switched from OFF and ON states to ON and OFF states, respectively. Considering the inverter gate signal as a whole with respect to the inverter 4, the switching from the vector V01 to the vector V41 is realized by the switching of this inverter gate signal. In the same manner, switching of the voltage vector in the inverter 5 is realized by the switching of the inverter gate signals Sup2*, Sun2*, Svp2*, Svn2*, Swp2*, Swn2*.

As described using the FIG. 4, in the time period dst·ts, the common-mode voltage Vcm1 (the solid-line graph) takes the values −Ed/2, −Ed/6, +Ed/6 in correspondence with the vectors V01, V41, V61, respectively. As described using FIG. 6, in the time period dst·ts, the common-mode voltage Vcm2 (the broken-line graph) takes the values +Ed/2, +Ed/6, −Ed/6 in correspondence with the vectors V72, V62, V42, respectively.

Conduction patterns of the inverter gate signals Sup2*, Svp2, Swp2* shown in FIG. 12 are different from conduction patterns of the inverter gate signals Sup*, Svp*, Swp* shown in FIG. 6. This is due to the fact that the carrier C22 used in a process of generating the inverter gate signals Sup2*, Svp2*, Swp2* has the phase opposite to the phase of the carrier C1.

As a result, a time period in which the voltage vector adopts the zero vector V72 in the inverter 5 includes a timing at which the commutation is caused in the converter 3 (at a timing at which the carrier C1 takes the value drt). As already described in the foregoing section "B", when the inverter 4 is operated based on the carrier C1, the time period in which the voltage vector adopts the zero vector V0 includes the timing at which the commutation is caused in the converter 3. As described above, the carrier C21 is synchronized with the carrier C1 (more specifically, they are coincident with each other here), and therefore the time period in which the voltage vector adopts the zero vector V01 in the inverter 4 includes the timing at which the commutation is caused in the converter 3. That is, in the operation described in this section, the zero vectors V01, V72 are set in a time period including the timing at which the commutation is caused in the converter 3, which can realize the commutation in the converter 3 at the so-called zero current.

Furthermore, as clearly seen from FIG. 12, the tendencies of rise and drop of the common-mode voltages Vcm1, Vcm2 are opposite to each other. More specifically, when the voltage vector switches from the zero vectors V01, 72, which are set in the time period including the timing at which the commutation is caused in the converter 3, to the next vectors V41, V62, respectively, the common-mode voltage Vcm1 rises from the value −Ed/2 to the value −Ed/6 and the common-mode voltage Vcm2 drops from the value +Ed/2 to the value +Ed/6, in the time period dst·ts. Therefore, even when an expiration of the time period in which the inverter 4 adopts the zero vector V01 coincides with an expiration (or an initial stage) of the time period in which the inverter 5 adopts the zero vector V72, the common-mode currents of them cancel out each other, to reduce the total amount of the common-mode current. The same is true in the time period drt·ts.

A description will be given of what kind of situation causes the worst case in terms of the occurrence of the common-mode current where the expirations of the zero vectors V01, V72 coincide with each other. In a case where the loads M1, M2 are according to the same specification and performed under the same conditions, the first command value and the second command value coincide with each other. Additionally, when the phase voltage command is generated by a two-phase modulation, the inverter gate signals Sup1*, Svp1*, Swp1* coincide with the inverter gate signal Sup2*, Svp2*, Swp2*, if the waveforms shown in FIG. 10 and FIG. 11 are used. More details are as follows.

When the first command value and the second command value coincide with each other as described above, the phase command values φ1, φ2 also coincide with each other. Hereinafter, this coinciding phase command value is represented as a phase cp. Because of the symmetry of the waveform, the consideration can be given within a range of 0°<φ<60° without loss of generality. In this range, with reference to the description of FIG. 3 and FIG. 5, the following equation (1) is satisfied:

$$Vu1^* = K \cdot \sin(\varphi + 60°), \quad Vw2^* = 1 - K \cdot \sin(\varphi + 60°) \qquad (1).$$

With reference to FIG. 12, the carriers C21, C22 have phases opposite to each other, and moreover have the same maximum value and the same minimum value of 1 and 0, respectively. Therefore, in a case where the following equation (2) is satisfied, the expirations of the zero vectors V01, V72 coincide with each other:

$$dst(1-Vu1^*)=dst \cdot Vw2^* \qquad (2).$$

Since it is clear from the equation (1), that the values 1−Vu1*, Vw2* are equal to each other, it is also clear that the equation (2) is satisfied. Therefore, when the loads M1, M2 are according to the same specification and performed under the same conditions, by using the two-phase modulation waveforms shown in FIG. 10 and FIG. 11, the expirations of the zero vectors V01, V72 coincide with each other. The same is true in the initial stages of the zero vectors V01, V72.

FIG. 12 shows as if a timing at which the voltage vector adopted in the inverter 4 switches between the vector V41 and the vector V61 was substantially coincident with a timing at which the voltage vector adopted in the inverter 5 switches between the vector V62 and the vector V42, to cancel out the common-mode currents at this timing. However, generally, it cannot be stated that such a cancellation is caused. To cause such a cancellation, the following equation (3) has to be satisfied with reference to FIG. 12 (the equation (3) means Vv1*=Vv2*):

$$dst(1-Vv1^*)=dst(1-Vv2^*) \qquad (3)$$

However, for example, in a range of 0°<φ<60°, the following equation (4) is satisfied, with reference to the description of FIG. 3 and FIG. 5:

$$Vv1^*=K \cdot \sin \phi, Vv2^*=1+K \cdot \sin(\phi+300°) \qquad (4)$$

Accordingly, since whether the equation (3) is satisfied or not depends on the phase φ, the common-mode currents are not necessarily cancelled out except in the initial stages and the expirations of the zero vectors V01, V72.

In this manner, in the waveform of the phase voltage command, it is desirable that the sum of the maximum phase (in the above example, the phase voltage command Vu1*) of the waveform used for driving the inverter 4 and the minimum phase (in the above example, the phase voltage command Vw2*) of the waveform used for driving the inverter 5 is equal to the maximum amplitude of the carriers C21, C22.

Figure 13:
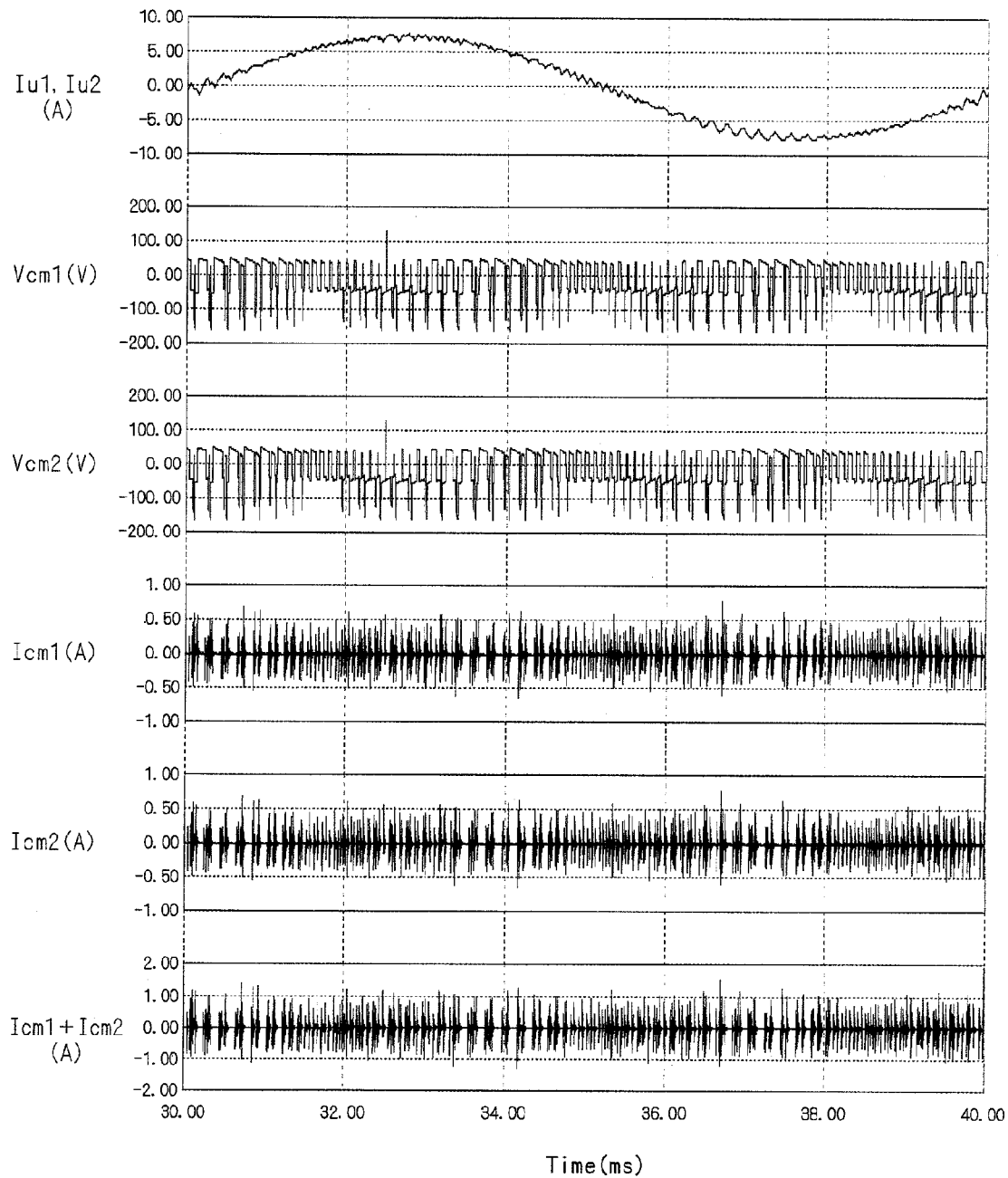
FIG. 13 is graphs showing inverter currents and common-mode currents.

FIG. 13 and FIG. 14 depict graphs showing inverter currents and common-mode currents. A current Iu1, Iu2 flowing in the U-phase of each of the inverters 4, 5 is shown as a representative of the inverter currents. The voltage values of the AC voltages Vr, Vs, Vt are 200 V, the modulation rate is 1, and a frequency of the carrier is 5 kHz. An output frequency of the inverter is 100 Hz. In FIG. 13 and FIG. 14, one cycle (10 ms) of an output waveform of the inverter is shown.

FIG. 13 shows a case of using a two-phase modulation which is the technique described in the foregoing section "B". In other words, it is a case where the carrier C1 is commonly used for generating the inverter gate signals of the inverters 4, 5, and the waveforms shown in FIG. 3 are commonly used for the phase voltage commands, too. FIG. 14 shows a case of using a two-phase modulation which is the technique described in this section. That is, it is a case where the carriers C21, C22 are used for generating the inverter gate signals of the inverters 4, 5, respectively, and the waveforms shown in FIG. 10 and FIG. 11 are used for the phase voltage command. In either of the cases, a case where the initial stages and the expirations of the zero vectors coincide between the inverters 4, 5 for allowing the common-mode current to pass most readily, is shown.

With reference to FIG. 13, since the inverters 4, 5 perform operations equivalent to each other, the inverter currents coincide with each other. Additionally, the common-mode voltages Vcm1, Vcm2 coincide with each other, and thus the common-mode currents Icm1, Icm2 also coincide with each other. Each of the common-mode currents Icm1, Icm2 is 0.122 A (effective value), and they have the identical waveforms. Therefore, the sum of the common-mode currents (indicated as "Icm1+Icm2" in the drawing: the same is true in the following) is twice the common-mode current Icm1 (0.244 A (effective value)).

With reference to FIG. 14, on the other hand, since the inverters 4, 5 operate in a complementary manner when seen in accordance with the frequency of the carrier, the small peaks and troughs in the inverter currents Iu1, Iu2 are in opposite phases. Since the common-mode voltages Vcm1, Vcm2 transit in opposite manners, the common-mode currents Icm1, Icm2 are also in opposite phases. As a result, the effective value of the sum of the common-mode currents is 0.121 A, while the effective value of the common-mode currents Icm1, Icm2 is 0.120 A. This result indicates that the effective value of the sum of the common-mode currents is reduced to almost the half, as compared with the result shown in FIG. 13. It can be considered that this is because although the common-mode currents at the initial stages and the expirations of the zero vectors are cancelled out, the leakage current in the time periods in which other vectors V6, V4 are adopted is doubled, to be consequently equal to the leakage current corresponding to one inverter.

In the waveforms shown in FIG. 10 and FIG. 11, the sum of the minimum phase (in the above example, the phase voltage command Vw1*=0) of the waveform used for during the inverter 4 and the maximum phase (in the above example, the phase voltage command Vu2*=1) of the waveform used for driving the inverter 5 is also equal to the maximum amplitude of the carriers C21, C22. However, as described using FIG. 12, since the zero vectors V71, V02 do no appear here, the cancellation of the common-mode currents in the initial stages and the expirations thereof does not occur. However, in a case where the waveforms of the three-phase modulation as shown in FIG. 7 are used for the phase voltage commands, the zero vectors V71, V02 appear and the cancellation of the common-mode currents in the initial stages and the expirations thereof occurs.

Similarly to FIG. 7, FIG. 15 depicts graphs showing phase voltage commands of three-phase modulated waveforms. The modulated waveform generation sections 611, 621 adopts the waveforms of the phase voltage commands Vu*, Vv*, Vw* shown in FIG. 15, as the phase voltage commands Vu1*, Vv1*, Vw1* and the phase voltage commands Vu2*, Vv2*, Vw2*, respectively.

Figure 16:
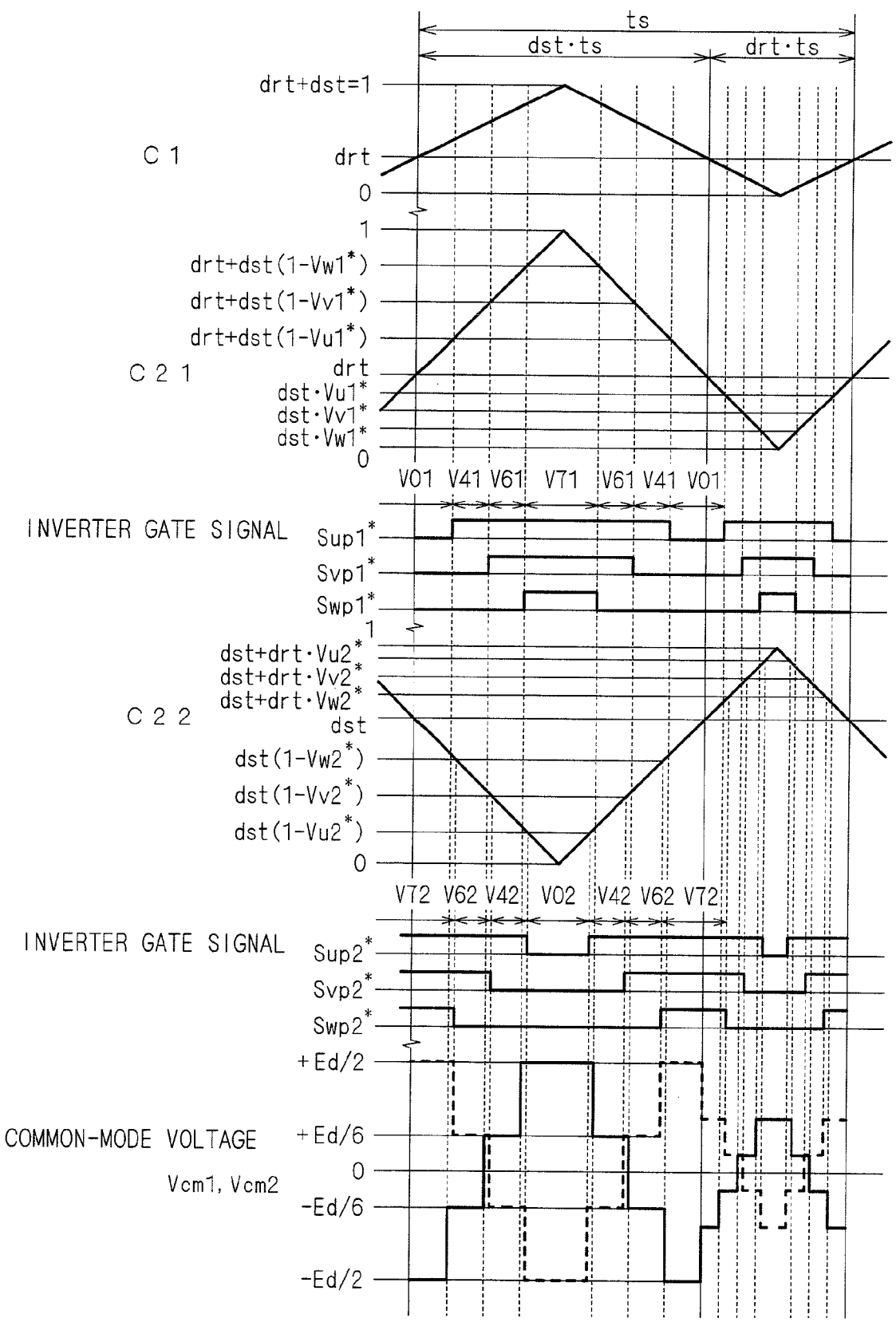
FIG. 16 is graphs showing waveforms of various signals and voltages.

FIG. 16 depicts graphs showing waveforms of the carriers C1, C21, C22, the inverter gate signals Sup1*, Svp1*, Swp1*, Sup2*, Svp2*, Swp2*, and the common-mode voltages Vcm1, Vcm2. In this case, with reference to the description of (i) above, in the time period dst·ts, at the time point at which the carrier C21 takes the value drt+dst·(1−Vw1*) which is distant from the value drt by the value dst·(1−Vw1*), the voltage vector switches between the vector V61 and the vector V71, and adopts it. With reference to the description of (ii) above, in the time period dst·ts, at the time point when the carrier C22 adopts the value dst·(1−Vu2*) which is distant from the value dst by the value dst·Vw2*, the voltage vector switches between the vector V42 and V02, and adopts it. With reference to the description (iii) above, in the time period drt·ts, at the time point when the carrier C21 takes the value drt·Vw1* which is distant from the value drt by the value drt·(1−Vw1*), the voltage vector switches between the vector V61 and the vector V71, and adopts it (illustration of the vector is omitted). With reference to the description of (iv) above, in the time period drt·ts, at the time point when the carrier C22 takes the value dst+drt·Vu2* which is distant from the value dst by the value drt·Vu2*, the voltage vector switches between the vector V42 and V02, and adopts it (illustration of the vector is omitted).

A description will be given of what kind of situation causes the worst case in terms of the occurrence of the common-mode current where the expirations of the zero vectors V01, V72 coincide with each other when this three-phase modulated phase voltage commands are used. In a case where the loads M1, M2 are according to the same specification and performed under the same conditions, the first command value and the second command value coincide with each other. Additionally, assuming that both of the phase command values φ1, φ2 adopt the phase φ312 (see FIG. 15), the inverter gate signals Sup1*, Svp1*, Swp1* and the inverter gate signals Sup2*, Svp2*, Swp2* also coincide with each other. More details are as follows.

Because of the symmetry of the waveform, the consideration can be given within a range of 0°<φ<60° without loss of generality. In this range, with reference to FIG. 15 and Japanese Patent Publication No. 6-81514 (1994), the equation (5) is satisfied:

$$Vu1^* = K\cdot\sin(\phi+60°),\ Vw2^* = 1 - K\cdot\sin(\phi+60°) \quad (5).$$

Referring to FIG. 16, similarly to the case shown in FIG. 12, when the above equation (2) is satisfied, the expirations of the zero vectors V01, V72 coincide with each other. If the equation (5) is satisfied, the equation (2) is also satisfied. Accordingly, in a case where the three-phase modulation is used, similarly to the case where the two-phase modulation is used, the expirations of the zero vectors V01, V72 coincide with each other. The same is true in the initial stages of the zero vectors V01, V72.

However, in a case where the three-phase modulation is used, if the first command value and the second command value coincide with each other, the phase voltage commands Vv1*, Vv2* coincide with each other. Therefore, the timing at which the voltage vector adopted in the inverter 4 switches between the vector V41 and the vector V61 is also substantially coincide with the timing at which the voltage vector adopted in the inverter 5 switches between the vector V62 and the vector V42. At this timing, the common-mode currents are cancelled out.

In the same manner, the timing at which the voltage vector adopted in the inverter 4 switches between the vector V61 and the vector V71 is substantially coincide with the timing at which the voltage vector adopted in the inverter 5 switches between the vector V42 and the vector V02. At this timing as well, the common-mode currents are cancelled out.

Figure 18:
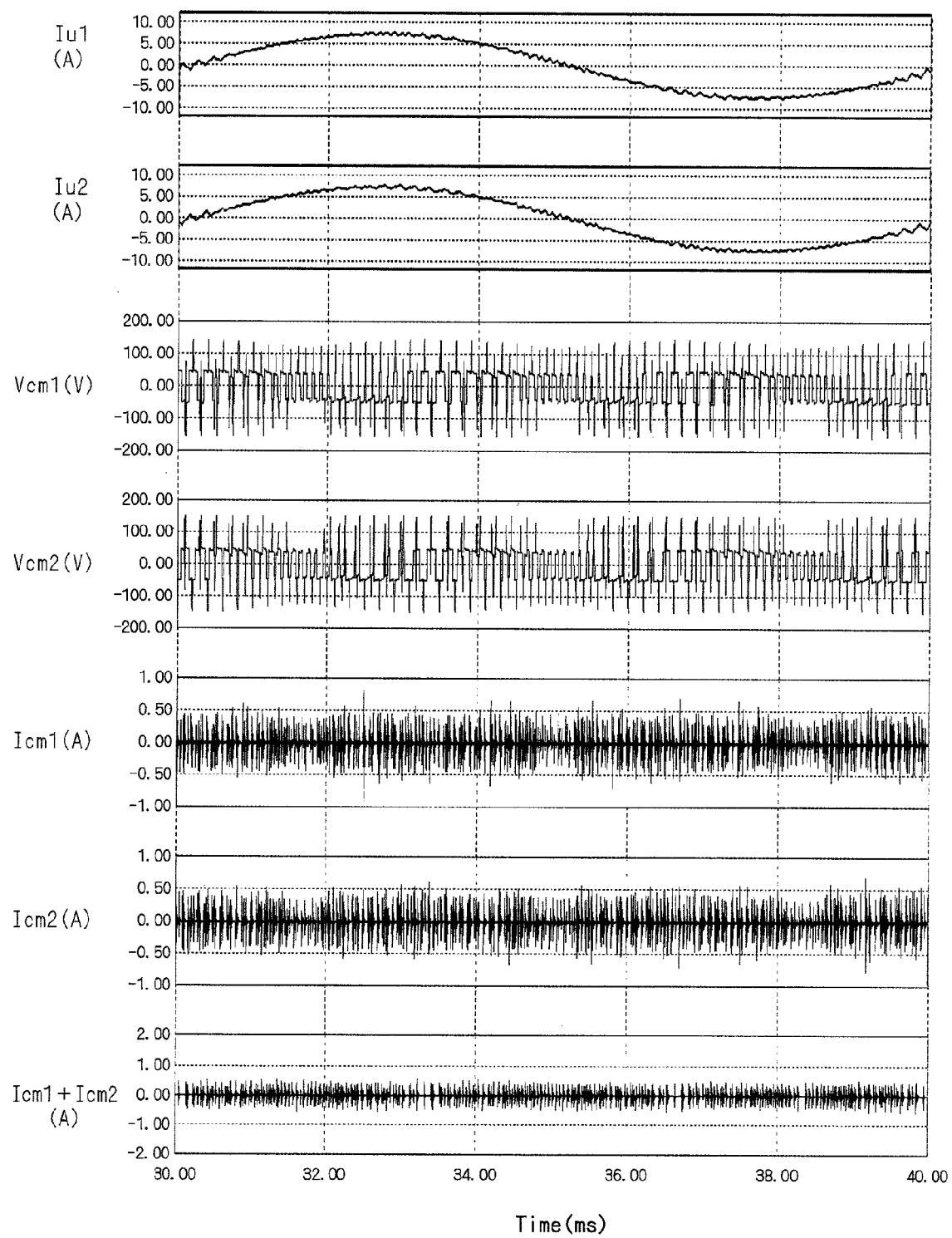
FIG. 18 is graphs showing inverter currents and common-mode currents.

FIG. 17 and FIG. 18 are graphs showing inverter currents and common-mode currents. Except for the adoption of the waveforms shown in FIG. 7 and FIG. 15 as the phase voltage commands, the specifications described in FIG. 13 and FIG. 14 are used.

FIG. 17 shows a case of using the two-phase modulation which is the technique described in the foregoing section "B". In other words, it is a case where the carrier C1 is commonly used for generating the inverter gate signals of the inverters 4, 5, and the waveforms shown in FIG. 7 are commonly used for the phase voltage commands, too. FIG. 18 shows a case of using the three-phase modulation which is the technique described in this section. That is, it is a case where the carriers C21, C22 are used for generating the inverter gate signals of the inverters 4, 5, respectively, and the waveforms shown in FIG. 15 are used for any of the phase voltage commands. In either of the cases, a case where the initial stages and the expirations of the zero vectors coincide for allowing the common-mode current to pass most readily, is shown.

With reference to FIG. 17, similarly to FIG. 13, the inverter currents Iu1, Iu2, the common-mode voltages Vcm1, Vcm2, and the common-mode currents Icm1, Icm2 coincide with each other. Each of the common-mode currents Icm1, Icm2 is 0.140 A (effective value). This value is greater than the value 0.122 A described in FIG. 13, conceivably because the common-mode current increases in the initial stage and the expiration (switching between the vectors V61, V71, and switching between the vectors V02, V42) of the zero vector at a timing when the commutation is not caused in the converter 3. The effective value of the sum of the common-mode currents is 0.280 A (effective value).

With reference to FIG. 18, on the other hand, the small peaks and troughs in the inverter currents Iu1, Iu2 are in opposite phases. Since the common-mode voltages Vcm1, Vcm2 transit in opposite manners, the common-mode currents Icm1, Icm2 are also in opposite phases. As a result, the effective value of the sum of the common-mode currents is 0.118 A, while the effective value of the common-mode currents Icm1, Icm2 is 0.137 A. This result indicates the reduction to a value less than the half of the effective value of the sum of the common-mode currents, as compared with the result shown in FIG. 17. It can be considered that this is because the common-mode currents are cancelled out not only at the zero vector but also when the voltage vector is switched.

D. Case of Single Load

In the foregoing section "C", the description has been given considering the condition for the concentration of the common-mode currents while the loads M1, M2 are provided individually for the respective inverters 4, 5 in view of FIG. 1. Here, a description will be given of a case where a single load is provided for the inverters 4, 5. In this case, the inverters 4, 5 drive the same load, and therefore an operation causing the concentration of the common-mode currents is likely to be performed.

Figure 19:
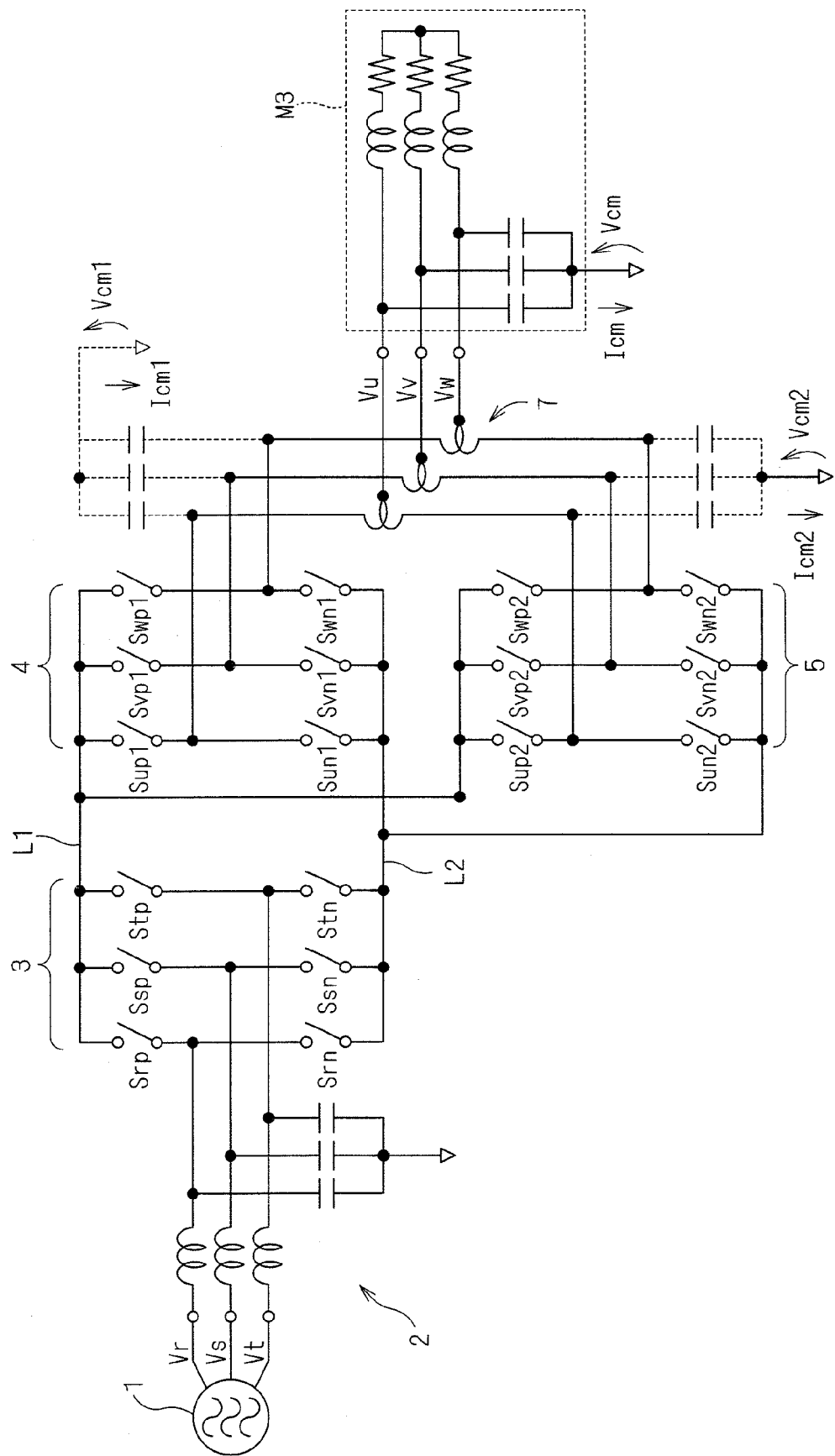
FIG. 19 is a circuit diagram showing another configuration of the direct-type converting apparatus to which the embodiments are applicable.

FIG. 19 is a circuit diagram showing another configuration of a direct-type converting apparatus to which the present invention is applicable. As compared with the configuration shown in FIG. 1, a characteristically different point is that a single load M3 of three-phase is connect to the inverters 4, 5 via an output reactor group 7.

The output reactor group 7 is made up of three reactors each corresponding to each of the phases and connecting output sides of the inverters 4, 5 to each other. Three-phase voltages Vu, Vv, Vw are obtained from midpoints of the respective reactors, and given to the load M3. The load M3 is an inductive load and, for example, is a motor having three-phase coils which are Y-connected and to which the voltages Vu, Vv, Vw are applied. Parasitic capacitances are shown as three Y-connected capacitors.

The common-mode voltage Vcm in the load M3 is recognized as a potential of a neutral point at which the parasitic capacitances of the load M3 are Y-connected. However, for convenience of analysis, based on the symmetry of the connection of the load M3 with respect to the inverters 4, 5, the common-mode voltage Vcm can be also recognized as a synthesis of the common-mode voltages Vcm1, Vcm2 shown in FIG. 19.

That is, it is assumed that there are the Y-connected parasitic capacitances at both ends of the three reactors constituting the output reactor group 7. The common-mode voltages Vcm1, Vcm2 are recognized as potentials of neutral points of these two Y-connections, respectively, and the common-mode currents Icm1, Icm2 are recognized as leakage currents flowing out from the respective neutral points.

Figure 20:
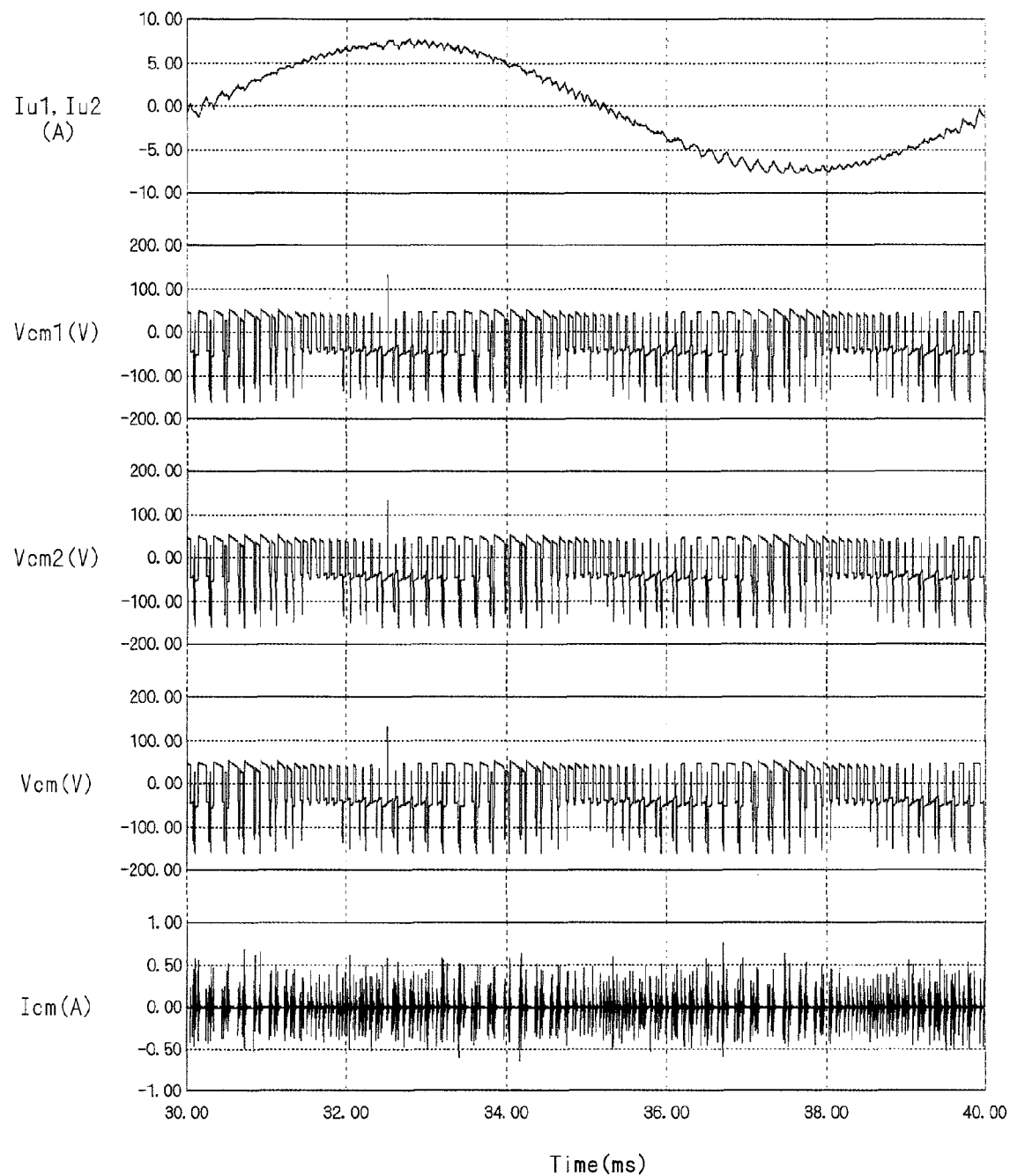
FIG. 20 is graphs showing inverter currents and common-mode currents.
Figure 21:
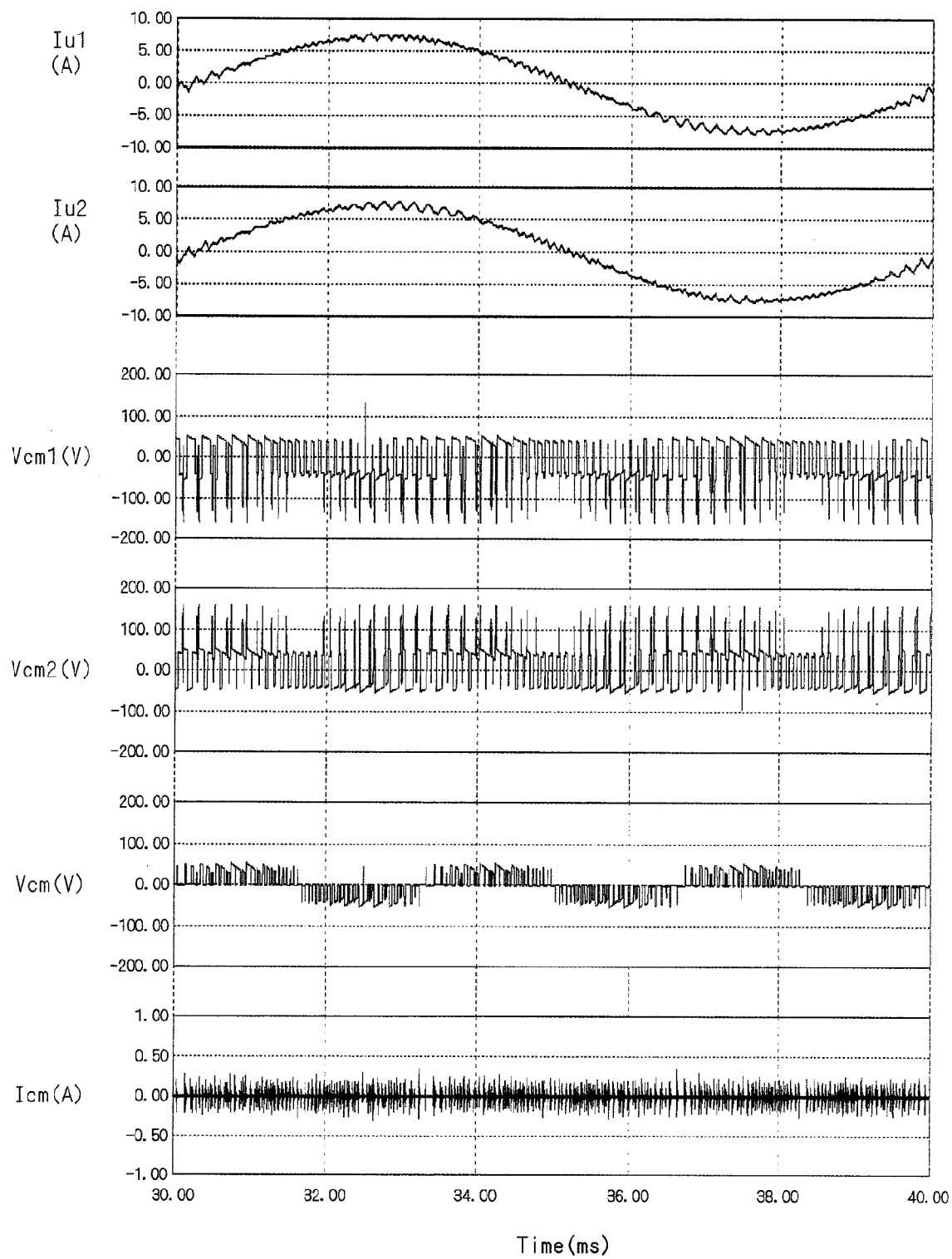
FIG. 21 is graphs showing inverter currents and common-mode currents.

FIG. 20 and FIG. 21 depict graphs showing inverter currents and common-mode currents. FIG. 20 shows a case of using the two-phase modulation which is the technique described in the foregoing section "B". In other words, it is a case where the carrier C1 is commonly used for generating the inverter gate signals of the inverters 4, 5, and the waveforms shown in FIG. 3 are commonly used for the phase voltage commands, too. FIG. 21 shows a case of using the two-phase modulation which is the technique described in the foregoing section "C". That is, it is a case where the carriers C21, C22 are used for generating the inverter gate signals of the inverters 4, 5, respectively, and the waveforms shown in FIGS. 10 and 11 are used for any of the phase voltage commands. In either of the cases, a case where the initial stages and the expirations of the zero vectors coincide for allowing the common-mode current to pass most readily, is shown.

With reference to FIG. 20, similarly to FIG. 13, the inverter currents Iu1, Iu2 and the common-mode voltages Vcm1, Vcm2 coincide with each other. Since the common-mode voltages Vcm1, Vcm2 are applied to positions which are connected in parallel with each other, the common-mode voltage Vcm obtained as a synthesis of them is also equal to the common-mode voltages Vcm1, Vcm2. A synthesized value Icm of the common-mode currents Icm1, Icm2 is 0.122 A (effective value). This value is the half of the value 0.244 of the synthesized value Icm described in FIG. 13, conceivably because the load M3 is set equal to each of the loads M1, M2 and additionally only one load M3 is provided.

With reference to FIG. 21, similarly to FIG. 14, the inverter currents Iu1, Iu2 have phases opposite to each other when seen in the cycle of the frequency of the carrier, and the common-mode voltages Vcm1, Vcm2 have phases opposite to each other. Since the common-mode voltages Vcm1, Vcm2 are applied to positions which are connected in parallel with each other, and the common-mode voltage Vcm which is the synthesis of them is reduced to less than the common-mode voltages Vcm1, Vcm2. The synthesized value Icm of the common-mode currents Icm1, Icm2 is 0.06 A (effective value). This value is approximately the half of the value 0.121 of the synthesized value Icm described in FIG. 14, conceivably because the load M3 is set equal to each of the loads M1, M2 and additionally only one load M3 is provided.

Figure 23:
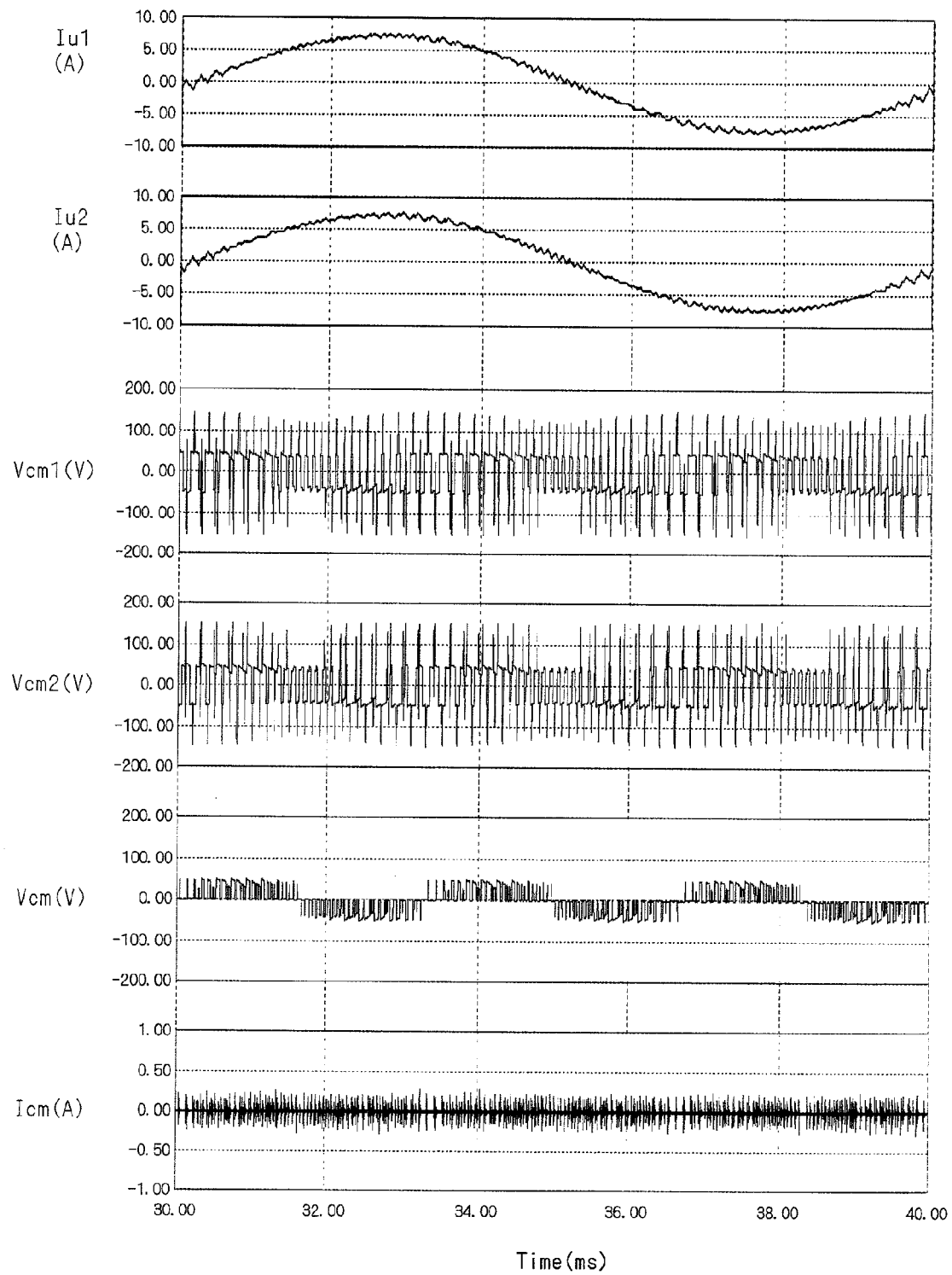
FIG. 23 is graphs showing inverter currents and common-mode currents.

FIG. 22 and FIG. 23 are graphs showing inverter currents and common-mode currents. FIG. 22 shows a case of using the three-phase modulation which is the technique described in the foregoing section "B". In other words, it is a case where the carrier C1 is commonly used for generating the inverter gate signals of the inverters 4, 5, and the waveforms shown in FIG. 7 are commonly used for the phase voltage commands, too. FIG. 23 shows a case of using the three-phase modulation which is the technique described in the foregoing section "C". That is, it is a case where the carriers C21, C22 are used for generating the inverter gate signals of the inverters 4, 5, respectively, and the waveforms shown in FIG. 15 are used for any of the phase voltage commands. In either of the cases, a case where the initial stages and the expirations of the zero vectors coincide for allowing the common-mode current to pass most readily, is shown.

With reference to FIG. 22, similarly to FIG. 17, the inverter currents Iu1, Iu2 and the common-mode voltages Vcm1, Vcm2 coincide with each other. The synthesized value Icm of the common-mode currents Icm1, Icm2 is 0.140 A (effective value). This value is the half of the value 0.280 A of the synthesized value Icm described in FIG. 17, conceivably because the load M3 is set equal to each of the loads M1, M2 and additionally only one load M3 is provided.

With reference to FIG. 23, similarly to FIG. 18, the inverter currents Iu1, Iu2 have phases opposite to each other when seen in the cycle of the frequency of the carrier, and the common-mode voltages Vcm1, Vcm2 have phases opposite to each other. The synthesized value Icm of the common-mode currents Icm1, Icm2 is 0.06 A (effective value). This value is approximately the half of the value 0.118 of the synthesized value Icm described in FIG. 18, conceivably because the load M3 is set equal to each of the loads M1, M2 and additionally only one load M3 is provided.

The invention claimed is:

1. A method for controlling a direct-type converting apparatus, said direct-type converting apparatus comprising:
a converter configured to rectify multi-phase AC voltages to output them to a pair of DC power supply lines; and
a first inverter and a second inverter being connected in parallel with each other between said pair of DC power supply lines, either of them being operated in a pulse-width modulation according to an instantaneous space vector control,
said method comprising:
causing a commutation in said converter, when said first inverter is operated based on a first zero vector while said second inverter is operated based on a second zero vector, said first zero vector and said second zero vector being different from each other.

2. The method for controlling a direct-type converting apparatus according to claim 1, wherein
either of said first inverter and said second inverter has a plurality of current paths which are connected in parallel with each other between said pair of DC power supply lines,
each of said current paths includes a pair of switching elements being connected in series with each other between said pair of DC power supply lines, an output being taken from a connection point between said pair of switching elements,
when said first inverter is operated based on said first zero vector, a first of said pair of switching elements at one side of said pair of DC power supply lines is rendered non-conducting while a second of said pair of switching elements at the other side of said pair of DC power supply lines is rendered conducting, in any of said current paths of said first inverter,
when said second inverter is operated based on said second zero vector, said first of said pair of switching elements is rendered conducting while said second said pair of switching elements is rendered non-conducting, in any of said current paths of said second inverter.

3. The method for controlling a direct-type converting apparatus according to claim 1, wherein
a first carrier adopted for a control of said first inverter and a second carrier adopted for a control of said second inverter have phases opposite to each other, have maximum values thereof coincident with each other, and have minimum values thereof coincident with each other,
said converter is operated in a pulse-width modulation,
a carrier adopted for a control of said converter is synchronized with said first carrier and said second carrier, and one cycle thereof is divided by a first value and a second value into a first time period and a second time period at a timing when said commutation is caused, in said first time period,
- (i) a vector used for said instantaneous space vector control of said first inverter is switched, at a time point when said first carrier takes a value which is distant from a value taken by said first carrier at a start point of said first time period by a value obtained by multiplying, by said first value, a value obtained by subtracting from 1 a command value for said output of said first inverter, and
- (ii) a vector used for said instantaneous space vector control of said second inverter is switched, at a time point when said second carrier takes a value which is distant from a value taken by said second carrier at said start point of said first time period by a value obtained by multiplying, by said first value, a command value for said output of said second inverter, in said second time period,
- (iii) said vector used for said instantaneous space vector control of said first inverter is switched, at a time point when said first carrier takes a value which is distant from a value taken by said first carrier at a start point of said second time period by a value obtained by multiplying, by said second value, a value obtained by subtracting from 1 said command value for said output of said first inverter, and
- (iv) a vector used for said instantaneous space vector control of said second inverter is switched, at a time point when said second carrier takes a value which is distant from a value taken by said second carrier at said start point of said second time period by a value obtained by multiplying, by said second value, a command value for said output of said second inverter.

4. The method for controlling a direct-type converting apparatus according to claim 2, wherein a first carrier adopted for a control of said first inverter and a second carrier adopted for a control of said second inverter have phases opposite to each other, have maximum values thereof coincident with each other, and have minimum values thereof coincident with each other, said converter is operated in a pulse-width modulation, a carrier adopted for a control of said converter is synchronized with said first carrier and said second carrier, and one cycle thereof is divided by a first value and a second value into a first time period and a second time period at a timing when said commutation is caused, in said first time period,
- (i) a vector used for said instantaneous space vector control of said first inverter is switched, at a time point when said first carrier takes a value which is distant from a value taken by said first carrier at a start point of said first time period by a value obtained by multiplying, by said first value, a value obtained by subtracting from 1 a command value for said output of said first inverter, and
- (ii) a vector used for said instantaneous space vector control of said second inverter is switched, at a time point when said second carrier takes a value which is distant from a value taken by said second carrier at said start point of said first time period by a value obtained by multiplying, by said first value, a command value for said output of said second inverter, in said second time period,
- (iii) said vector used for said instantaneous space vector control of said first inverter is switched, at a time point when said first carrier takes a value which is distant from a value taken by said first carrier at a start point of said second time period by a value obtained by multiplying, by said second value, a value obtained by subtracting from 1 said command value for said output of said first inverter, and
- (iv) a vector used for said instantaneous space vector control of said second inverter is switched, at a time point when said second carrier takes a value which is distant from a value taken by said second carrier at said start point of said second lime period by a value obtained by multiplying, by said second value, a command value for said output of said second inverter.

5. The method for controlling a direct-type converting apparatus according to claim 3, wherein said output of either of said first inverter and said second inverter exhibits three phases, said command values for said output of said first inverter are determined by a two-phase modulation in which any one of them continuously takes a minimum value of said first carrier throughout a time period corresponding to a phase of 120 degrees, said command values for said output of said second inverter are determined in a two-phase modulation in which any one of them continuously takes a maximum value of said second carrier throughout a time period corresponding to a phase of 120 degrees.

6. The method for controlling a direct-type converting apparatus according to claim 4, wherein said output of either of said first inverter and said second inverter exhibits three phases, said command values for said output of said first inverter are determined by a two-phase modulation in which any one of them continuously takes a minimum value of said first carrier throughout a time period corresponding to a phase of 120 degrees, said command values for said output of said second inverter are determined in a two-phase modulation in which any one of them continuously takes a maximum value of said second carrier throughout a time period corresponding to a phase of 120 degrees.

7. The method for controlling a direct-type converting apparatus according to claim 3, wherein said output of either of said first inverter and said second inverter exhibits three phases, said command values for said output of said first inverter and said command values for said output of said second inverter are determined in a three-phase modulation.

8. The method for controlling a direct-type converting apparatus according to claim 4, wherein said output of either of said first inverter and said second inverter exhibits three phases, said command values for said output of said first inverter and said command values for said output of said second inverter are determined in a three-phase modulation.

9. A direct-type converting apparatus comprising:

a converter configured to rectify multi-phase AC voltages to output them to a pair of DC power supply lines;

a first inverter and a second inverter being connected in parallel with each other between said pair of DC power supply lines;

a first inverter control section configured to output a first control signal for operating said first inverter in a pulse-width modulation according to an instantaneous space vector control;

a second inverter control section configured to output a second control signal for operating said second inverter in a pulse-width modulation according to an instantaneous space vector control; and a converter control section configured to output a third control signal for causing a commutation in said converter when said first inverter is operated based on a first zero vector while said second inverter is operated based on a second zero vector different from said first zero vector.

10. The direct-type converting apparatus according to claim 9, wherein either of said first inverter and said second inverter has a plurality of current paths which are connected in parallel with each other between said pair of DC power supply lines, each of said current paths includes a pair of switching elements being connected in series with each other between said pair of DC power supply lines and whose conductions are controlled by said first control signal or said second control signal, an output being taken from a connection point between said pair of switching elements, when said first inverter is operated based on said first zero vector, a first of said pair of switching elements at one side of said pair of DC power supply lines is rendered non-conducting while a second of said pair of switching elements at the other side of said pair of DC power supply lines is rendered conducting, in any of said current paths of said first inverter, when said second inverter is operated based on said second zero vector, said first of said pair of switching elements is rendered conducting while said second of said pair of switching elements is rendered non-conducting, in any of said current paths of said second inverter.

11. The direct-type converting apparatus according to claim 9, wherein a first carrier adopted for a control of said first inverter and a second carrier adopted for a control of said second inverter have phases opposite to each other, have maximum values thereof coincident with each other, and have minimum values thereof coincident with each other, said converter is operated in a pulse-width modulation, a carrier adopted for a control of said converter is synchronized with said first carrier and said second carrier, and one cycle thereof is divided by a first value and a second value into a first time period and a second time period at a timing when said commutation is caused, in said first time period,
(i) said first control signal is switched, at a time point when said first carrier takes a value which is distant from a value taken by said first carrier at a start point of said first time period by a value obtained by multiplying, by said first value, a value obtained by subtracting from 1 a command value for said output of said first inverter, and
(ii) said second control signal is switched, at a time point when said second carrier takes a value which is distant from a value taken by said second carrier at said start point of said first time period by a value obtained by multiplying, by said first value, a command value for said output of said second inverter, in said second time period,
(iii) said first control signal is switched, at a time point when said first carrier takes a value which is distant from a value taken by said first carrier at a start point of said second time period by a value obtained by multiplying, by said second value, a value obtained by subtracting from 1 said command value for said output of said first inverter, and
(iv) said second control signal is switched, at a time point when said second carrier takes a value which is distant from a value taken by said second carrier at said start point of said second time period by a value obtained by multiplying, by said second value, a command value for said output of said second inverter.

12. The direct-type converting apparatus according to claim 10, wherein a first carrier adopted for a control of said first inverter and a second carrier adopted for a control of said second inverter have phases opposite to each other, have maximum values thereof coincident with each other, and have minimum values thereof coincident with each other, said converter is operated in a pulse-width modulation, a carrier adopted for a control of said converter is synchronized with said first carrier and said second carrier, and one cycle thereof is divided by a first value and a second value into a first time period and a second time period at a timing when said commutation is caused, in said first time period,
(i) said first control signal is switched, at a time point when said first carrier takes a value which is distant from a value taken by said first carrier at a start point of said first time period by a value obtained by multiplying, by said first value, a value obtained by subtracting from 1 a command value for said output of said first inverter, and
(ii) said second control signal is switched, at a time point when said second carrier takes a value which is distant from a value taken by said second carrier at said start point of said first time period by a value obtained by multiplying, by said first value, a command value for said output of said second inverter, in said second time period,
(iii) said first control signal is switched, at a time point when said first carrier takes a value which is distant from a value taken by said first carrier at a start point of said second time period by a value obtained by multiplying, by said second value, a value obtained by subtracting from 1 said command value for said output of said first inverter, and
(iv) said second control signal is switched, at a time point when said second carrier takes a value which is distant from a value taken by said second carrier at said start point of said second time period by a value obtained by multiplying, by said second value, a command value for said output of said second inverter.

13. The direct-type converting apparatus according to claim 11, wherein said output of either of said first inverter and said second inverter exhibits three phases, said command values for said output of said first inverter are determined by a two-phase modulation in which any one of them continuously takes a minimum value of said first carrier throughout a time period corresponding to a phase of 120 degrees, said command values for said output of said second inverter are determined in a two-phase modulation in which any one of them continuously takes a maximum value of said second carrier, throughout a time period corresponding to a phase of 120 degrees.

14. The direct-type converting apparatus according to claim 12, wherein said output of either of said first inverter and said second inverter exhibits three phases, said command values for said output of said first inverter are determined by a two-phase modulation in which any one of them continuously takes a minimum value of said first carrier throughout a time period corresponding to a phase of 120 degrees, said command values for said output of said second inverter are determined in a two-phase modulation in which any one of them continuously takes a maximum value of said second carrier throughout a time period corresponding to a phase of 120 degrees.

15. The direct-type converting apparatus according to claim 11, wherein said output of either of said first inverter and said second inverter exhibits three phases, said command values for said output of said first inverter and said command values for said output of said second inverter are determined in a three-phase modulation.

16. The direct-type converting apparatus according to claim 12, wherein said output of either of said first inverter and said second inverter exhibits three phases, said command values for said output of said first inverter and said command values for said output of said second inverter are determined in a three-phase modulation.

* * * * *